United States Patent [19]

Kawamura et al.

[11] 4,383,745
[45] May 17, 1983

[54] CAMERA AND AUTOMATIC EXPOSURE CONTROL THEREFOR FOR USE WITH VARIOUS TYPES OF FLASH UNITS

[75] Inventors: Masaharau Kawamura, Kawasaki; Masanori Uchidoi, Yokohama; Yoshihiro Shigeta, Tokyo; Yoji Sugiura; Hiroshi Yamamoto, both of Yokohama, all of Japan

[73] Assignee: Canon Kabushiki Kaisha, Tokyo, Japan

[21] Appl. No.: 115,748

[22] Filed: Jan. 28, 1980

[30] Foreign Application Priority Data

Jan. 31, 1979 [JP] Japan .................................. 54-10194
Jan. 31, 1979 [JP] Japan .................................. 54-10198

[51] Int. Cl.³ ........................................... G03B 15/05
[52] U.S. Cl. ............................................... 354/149
[58] Field of Search ................. 354/32, 60 L, 149, 33, 354/34, 35, 60 F, 139, 141

[56] References Cited

U.S. PATENT DOCUMENTS 4,063,257 12/1977 Mashimo et al. ............. 354/60 L X
4,095,242 6/1978 Tsunekawa et al. ........... 354/149 X
4,272,170 6/1981 Mashimo ............................ 354/149

Primary Examiner—A. D. Pellinen
Assistant Examiner—W. J. Brady
Attorney, Agent, or Firm—Toren, McGeady & Stanger

[57] ABSTRACT

In the disclosed camera, a switchover arrangement automatically shifts from an automatic exposure mode to a flash mode in response to a charge completion signal from a flash device. A line electrically connects a terminal capable of receiving the charge completion signal from the flash unit to the switchover arrangement. A switch connected to the connecting line applies a signal of a value corresponding to the charge completion signal from a signal source in the camera to the switchover arrangement to cause the latter to effect a switchover to the flash mode in response thereto in the same manner as when a charge completion signal is applied thereto.

4 Claims, 7 Drawing Figures

CAMERA AND AUTOMATIC EXPOSURE CONTROL THEREFOR FOR USE WITH VARIOUS TYPES OF FLASH UNITS

BACKGROUND OF THE INVENTION

1. Field of the Invention

The present invention relates to an automatic exposure control camera having no manual photographing mode, on which particularly a universal speed light device can be mounted.

2. Description of the Prior Art

So far, the automatic exposure control camera has the automatic exposure mode and the manual photographing mode. Consequently, in order to carry out the flash light photography by means of such an automatic exposure control camera it is necessary to mount an exclusive speed light device or a universal speed light device on the camera. When the exclusive speed light device is mounted on the camera, even if the automatic exposure photographing mode has been selected under the day light the flash light photographing mode is automatically selected by means of the charge completion signal from the exclusive speed light device so as to carry out the flash light photography. Further, when the universal speed light device is mounted on the camera, it is necessary to set the shutter time of the camera at 1/60 second of the manual photographing mode in order to carry out the flash light photography.

However, in case of an automatic exposure control camera with priority on the aperture value having only the automatic exposure photographing mode in order to lower the price and simplify the operation of the camera, it is not possible to mount the universal speed light device but the exclusive speed light device because no manual photographing mode is provided.

An object of the present invention is, in order to solve the above mentioned inconvenience, to enable the flash light photography by selecting the flash light photographing mode by compulsorily delivering a signal having a certain determined level to the change over means for changing over the automatic exposure photographing mode and the flash light photographing mode when the universal speed light device is used, taking into consideration the fact that the charge completion signal from the exclusive speed light device has a certain determined level.

Another object of the present invention is to enable the change over means to accept the charge completion signal until the time immediately before the start of the release operation and to prevent the misoperation of the speed light device at the time of the tail shutter curtain release.

DESCRIPTION OF THE PREFERRED EMBODIMENTS

Figure 1:
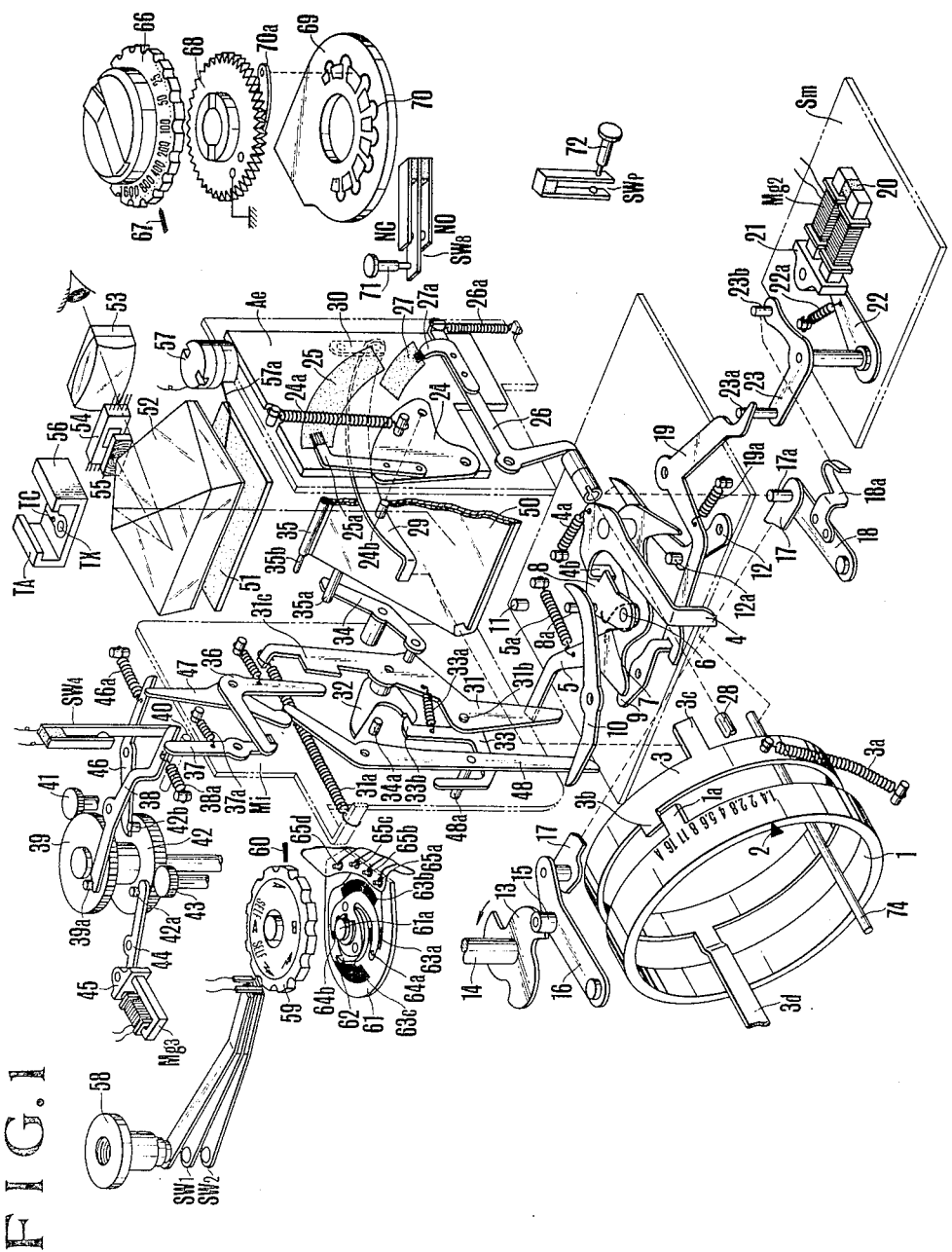
FIG. 1 shows the internal construction of an embodiment of the camera in accordance with the present invention.

Below, the present invention will be explained in detail in accordance with the drawings of the embodiments of the present invention. FIG. 1 shows the internal construction of the camera. 1 is the aperture setting ring provided with the automatic aperture setting index A, the automatic aperture setting values and a projection 1a. 2 is the index for coinciding the automatic aperture setting index A with a manual aperture setting value in the aperture setting ring 1. 3 is the aperture preset ring being urged along the clockwise direction by means of a spring 3a and presenting a projection 3b to be engaged with the projection 1a of the aperture setting ring 1. Further, the preset ring 3 is provided with an arm 3c and a lever 3d, by means of which lever the rotation of the bell crank is determined through the aperture setting cam ring not shown in the drawing, whereby the bell crank controls the rotation of the diaphragm driving ring not shown in the drawing so as to determine the opening angle of the diaphragm. 74 is the pin provided on the diaphragm driving ring, whereby the end of the pin 74 is engaged with the automatic aperture setting lever 4 urged along the counter-clockwise direction by means of the spring 4a of the automatic aperture setting unit Ad. The automatic aperture setting lever 4 has a rising up portion 4b. On the automatic aperture setting lever 4, the automatic aperture setting energy storing lever 5 is coaxially and rotatably provided. The automatic aperture setting energy storing lever 5 is urged along the clockwise direction by means of the spring 5a, while the shaft 6 is provided in the middle of the one side of the lever 5, whereby the shaft 6 is linked with the common lever 8 through the spring 7. The end of the common lever 8 is engaged with the folding down portion 4b of the automatic aperture setting lever 4, being provided with a pin 8a. Further, the automatic aperture setting energy storing lever 5 is provided with a holding claw for holding the strength of the spring 5a. 10 is the automatic aperture return signal lever, being engaged with the pin 8a of the common lever 8 at the one end. 11 is the stopper pin for controlling the rotation range of the automatic aperture setting energy setting lever 5. 12 is the charge lever for charging the spring 5a of the automatic aperture setting energy storing lever 5, whereby the pin 12a provided in the middle of the charge lever 12 is engaged with the one end of the automatic aperture setting energy storing lever 5. 13 is the charge lever provided on the shaft 14 operatively engaged with the winding up lever not shown in the drawing, whereby the operation of the charge cam due to the operation of the winding up lever is transmitted to the transmission lever 18 through the roller 15, the intermediary lever 16 and the connecting lever 17. The connecting lever 17 is provided with a pin 17a, which is engaged with the end of the charge lever 12 so as to operate the charge lever at the time of the winding up operation. 19 is the release lever urged along the counterclockwise direction by means of the spring 19a and engaged with the holding claw at the one end.

In the camera release unit sm, Mg2 is the magnet for releasing, having a permanent magnet 20. 21 is the armature of the magnet Mg2, while 22 is the armature holding lever. The holding lever 22 is urged along the counterclockwise direction by means of the spring 22a, whose strength is set stronger than that of the spring 19a of the release lever 19 but weaker than that of the attractive force of the permanent magnet 20. 23 is the start lever provided coaxially with the holding lever 22, being providing with the pins 23a and 23b, whereby the pin 23a is engaged with the other end of the release lever 19, while the pin 23b is pressed by means of the charge plate 18a provided on the transmission lever 18.

In the aperture control unit Ae, 24 is the lever for sliding a slidable contact 25a of the variable resistance 25, being electrically insulated and urged along the counterclockwise direction by means of the spring 24, whose strength is set weaker than that of the spring 3a of the aperture preset ring 3. 26 is the lever having a slidable contact 27a of the variable resistance 27, being urged along the clockwise direction by means of the spring 26a. Further, in the same way as in case of the lever 24, the lever 26 consists of an insulating material, whereby the variable resistances 25 and 27 are provided on the same base plate. The rotation position of the lever 26 is determined in accordance with the length of the totally opened aperture compensating pin 28 at the side of the lens so as to determine the value of the variable resistance 27. 29 is the signal lever, being engaged with the arm 3c of the aperture preset ring 3 at the one end and linked with the support lever 30 at the other end. Further, the middle part of the signal lever 29 is linked with the pin 24b of the lever 24.

In the mirror raising unit Mi, 31 is the mirror driving lever engaged with the other end of the automatic aperture setting energy storing lever 5, being urged along the counterclockwise direction by means of the spring 31a. The mirror raising lever 32 is coaxially linked with the mirror driving lever 31, being engaged with the hook part 33b of the raising holding claw 33 linked with the shaft 31b provided on the mirror driving lever 31. Further, the raising holding claw 33 is urged along the clockwise direction by means of the spring 33a. The mirror raising lever 32 is engaged with the pin 34 provided at the one end of the raising middle lever 34, while the other end of the raising middle lever 34 is engaged with the pin 35a provided on the mirror receiving plate 35. 35b is the rotation shaft of the mirror receiving plate 35. The mirror driving lever 31 is provided a projection 31c for pressing the one end of the leading shutter curtain holding lever 36. The other end of the leading shutter curtain holding lever 36 is engaged with the bent part at the one end of the leading shutter curtain release lever 37. The lever 37 is urged along the clockwise direction by means of the spring 37a. The other end of the leading shutter curtain release lever 37 is engaged with the leading shutter curtain tension lever 38, which is urged along the clockwise direction by means of the spring 38a and whose end is engaged with the pin 39a provided on the leading shutter curtain gear 39 for starting the leading shutter curtain of the shutter mechanism. 40 is the set lever for charging the leading shutter curtain 37 through the winding up mechanism not shown in the drawing along with the operation of the winding up shaft 14. SW4 is the normally closed count switch, which is opened along with the rotation of the leading shutter curtain tension lever 38. The leading shutter curtain gear 39 is engaged with the leading shutter curtain pinion 41 of the leading shutter curtain drum. 42 is the tail curtain gear provided coaxially with the leading shutter gear 39, being engaged with the tail shutter curtain pinion 43 of the tail shutter curtain drum. Further, the tail shutter curtain gear 42 is provided with pins 42a and 42b. 44 is the lever to be attracted, which is rotated by means of the pin 42a and provided with the armature 45 in such a manner that the armature 45 is attracted by means of the shutter control magnet Mg3. 46 is the tail shutter curtain signal lever to be rotated by means of the pin 42b of the tail shutter curtain gear 42, being urged along the clockwise direction by means of the spring 46a. The end of the tail shutter curtain signal lever 46 is engaged with one end of the lever 47, whose other end is engaged with the one end of the mirror return signal lever 48. The pin 48a privoried in the middle of the mirror return signal lever 48 is engaged with the end of the raising holding claw 33. Further, the other end of the mirror return signal lever 48 is also engaged with the end of the automatic diaphragm return signal lever 10 in the AD unit. The light having passed through the photographing lens is recognized by the photographer at the eye piece lens 53 through the reflecting mirror 50, the condensing Fresnel focal plate 51 and the pentagonal prism 52. 54 is the light sensing element on which a part of the light from the pentagonal prism is incident through the condenser lens 55, consisting of for example silicon photo cell. 56 is the accessory shoe provided on the camera body of the pentagonal prism 52, TX the synchronization contact terminal, TC the charge completion signal terminal and TA the earth terminal. 57 is the meter for displaying the shutter time in the view finder, whereby by means of the finger 57a the shutter time is pointed on the shutter time scale provided along the circumference of the finder. SW1 and SW2 are the switches to be closed with the first respectively the second stroke of the shutter release button 58 and 59 the mode change over dial which is provided with the automatic exposure mark A, the bulb photography mark B, the flash photography mark ⚡, the self timer flash photography mark SELF⚡ and self timer automatic exposure mark SELFA, whereby the respective mode photography is selected by setting these marks at the fixed index 60. 61 is the slide plate being provided with the engaging number 62 operatively engaged with the dial 61, while the engaging member 62 is provided with the brushes 64a and 64b to be brought into contact with the conductor patterns 63a, 63b and 63c. 65a–65d are the terminals, whereby 65a is the bulb mode terminal, 65b the self timer mode terminal, 65c the flash photography mode terminal and 65d the earth terminal. The terminal 65a is connected to the conductor pattern 63a, the terminal 65b to the conductor pattern 63b, the terminal 65c to the conductor pattern 63c and the terminal 65d to the brushes 64a and 64b through the slide plate 61 and the shaft 61a. When the mark A of the dial 59 is set at the fixed index 60, the brushes 64a and 64b are not brought into contact with the conductor patterns 63a, 63b and 63c, while the mark B is set at the index 60 only the contact of the brush 64a with the conductor pattern 63a is established. When the mark is set at the fixed index 60, only the contact of the brush 64b with the conductor pattern 63c is established, while the mark SELF⚡ is set at the index 60 the brush 64a is in contact with the conductor pattern 63b, while at the same time the brush 64b is in contact with the conductor pattern 63c. When the mark SELF⚡ is set at the mark 60, only the contact of the brush 64a with the conductor pattern 63b is established consequently, the conductor pattern 63a and the brush 64a constitute the bulb switch SW12, the conductor pattern 63b and the brush 64a the self timer switch SW7 and the conductor pattern 63c and the brush 64b the flash light switch SW30. 66 is the ASA set dial being provided with the film sensitivity value. 67 is the fixed index for setting the film sensitivity. 68 is the engaging member operatively engaged with the dial 66, being provided with the slide contact 70a of the variable resistance 70 on the slide plate 69. 71 is the battery check button and SW8 the change over switch normally in contact with the fixed contact NC, which is switched over to the fixed contact NO along with the operation of the button 71. SW10 is the normally opened switch for compensating the measured light value, which is closed along with the operation of the compensation button 72.

Figure 2:
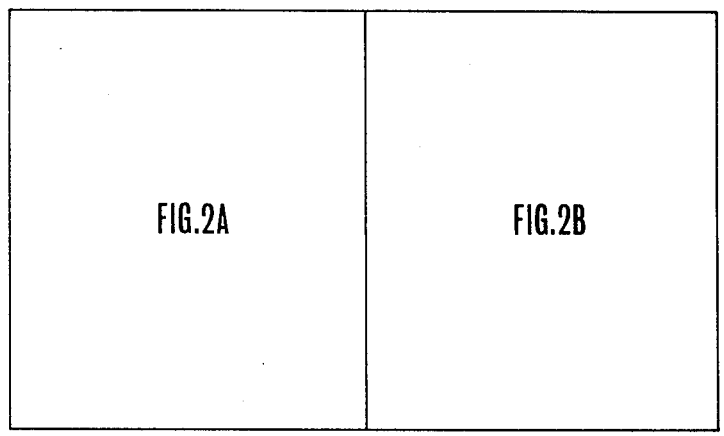
FIG. 2 shows the arrangement of FIGS. 2A and 2B.
Figure 2A:
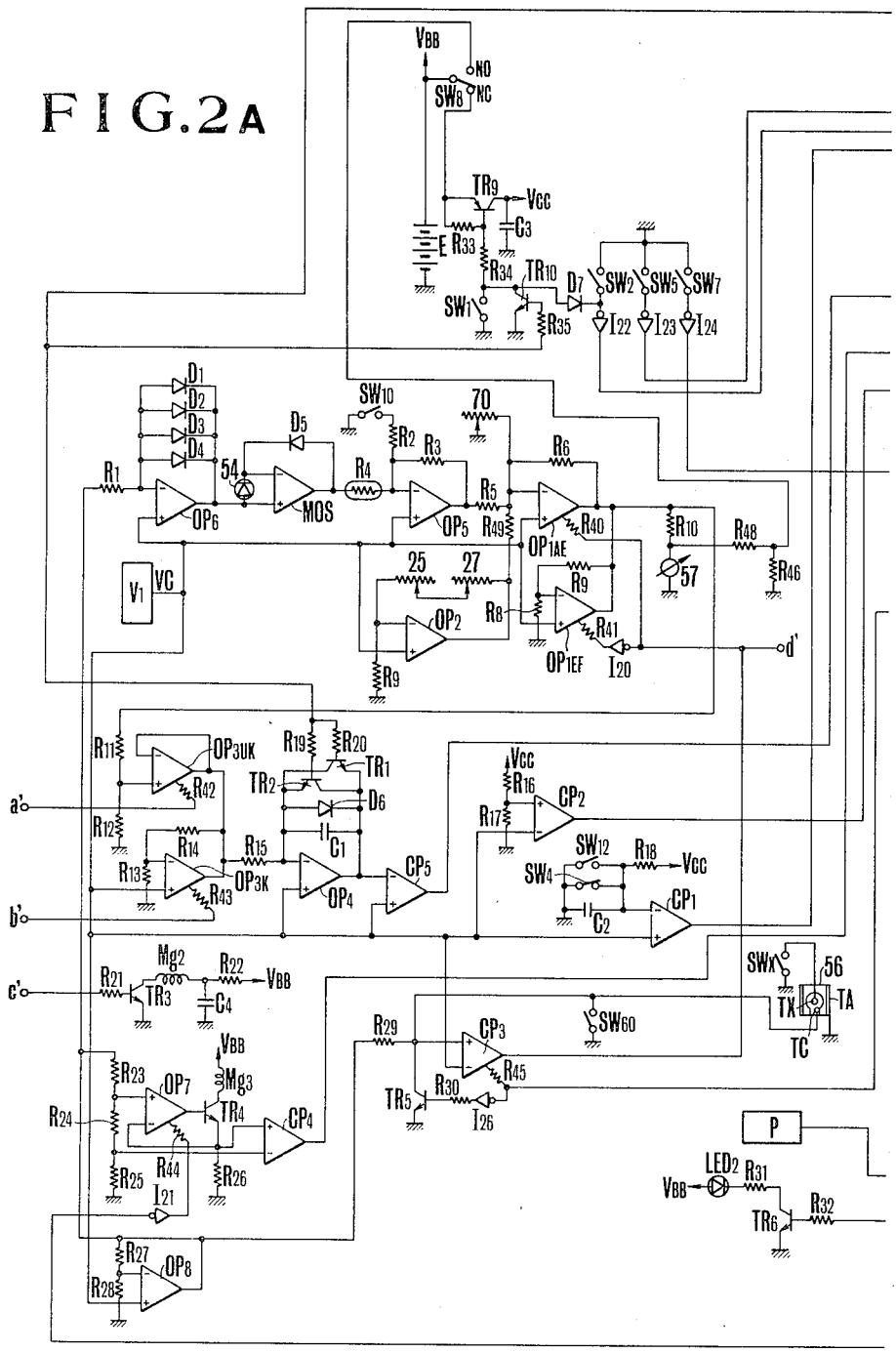
FIGS. 2A and 2B illustrates the control circuit for the camera shown in FIG. 1.
Figure 2B:
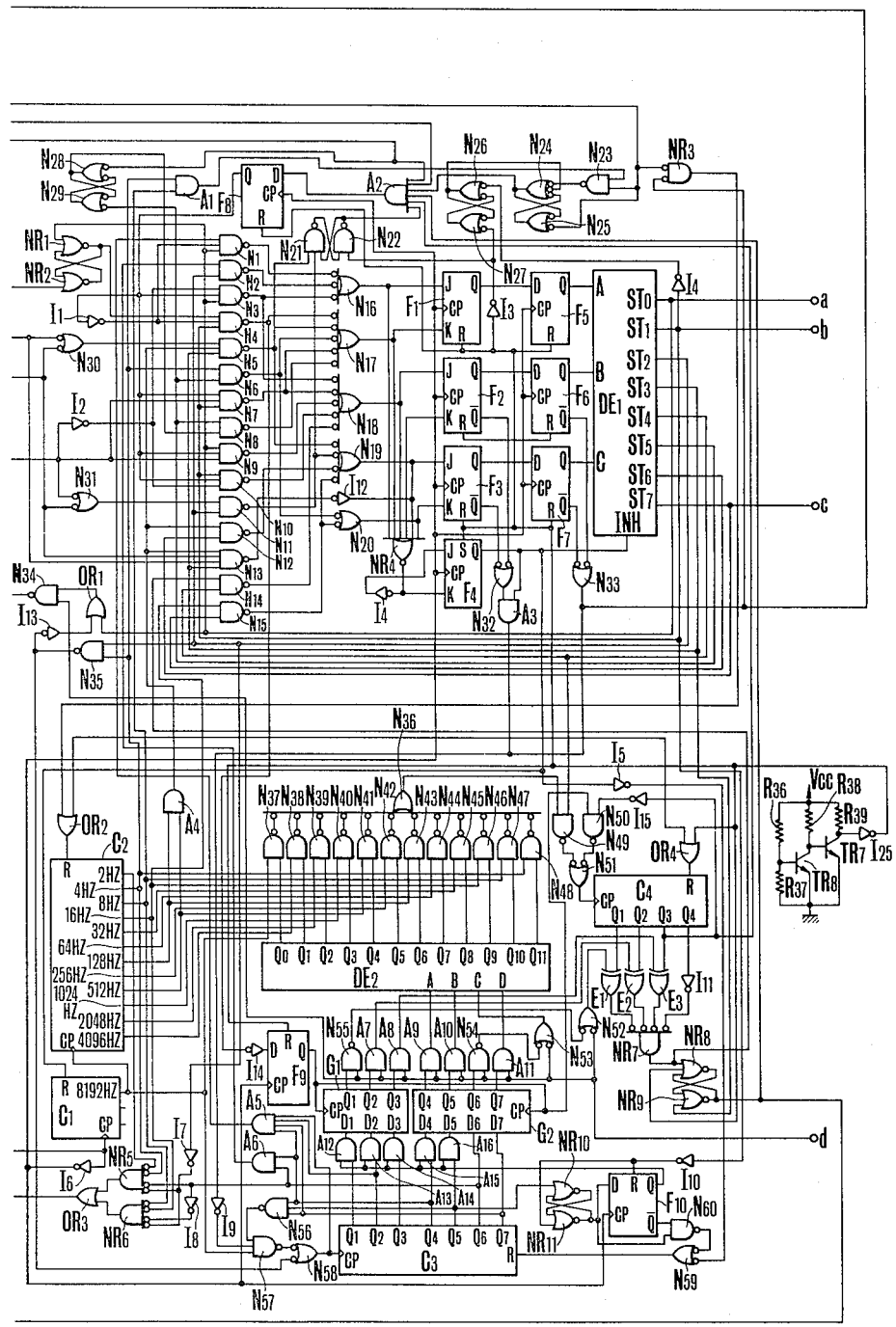

FIG. 2 shows the exposure control circuit of the camera shown in FIG. 1, whereby the circuit is constituted of a status circuit consisting of an analog circuit and a digital circuit. To begin with, the analog circuit will be explained below. E is the power source for supplying the source voltage VBB and SW8 the change over switch shown in FIG. 1 and connected to th power source E, whereby the switch SW8 is normally connected to the fixed contact NC and switched over to the fixed contact NO at the time of the battery checking. TR9 is the switching transistor whose emitter is connected to the fixed contact NC of the change over switch SW8, whereby the power source switch S1 shown in FIG. 1 is connected to the base of the transistor TR9 through the resistance R34 in such a manner that when the switch SW1 is closed the transistor TR9 is brought into the switched on state so as to produce the voltage Vcc from the emitter. C3 is the condenser for stabilizing the votage Vcc and R33 the resistance connected between the base and the emitter of the transistor TR9. The switching transistor TR10 is connected in parallel with the switch SW1 so as to be brought into the switched on state and hold the transistor TR9 in the switched on state when a high level signal is given to the base of the transistor TR10 from the NAND gate of the status circuit. The voltage Vcc produced when the transistor TR9 is brought into the switched on state or when the switch SW1 is closed serves as source voltage for each gate of the operational amplifiers. SW2 and SW1 are the release switch and the self timer switch explained in accordance with FIG. 1, and SW3 not shown in FIG. 1 is the winding up completion switch to be closed at the time of the winding up completion and opened when the tail shutter curtain has run. The signals produced in accordance with the closing and the opening of the switch SW2 are delivered to the AND gate A2 of the status circuit through the inverter I22, the signals produced in accordance with the closing and the opening of the switch SW3 to the NOR gate NR2 and the NAND gates N23, N25 of the status circuit through the inverter I23 and the signals produced in accordance with the closing and the opening of the switch SW7 to the NAND gates N7, N9 and N31 of the status circuit through the inverter I24 and the NAND gates N3 and N10 through the inverter I2. V1 is the constant voltage producing circuit for delivering the constant voltage Vc to the operational amplifiers OP-1EF, OP2, OP3K, OP4–OP6, and OP8 and the comparators CP1–CP3 and CP5 as standard voltage. The operational amplifier OP8 to whose inversing input terminal a voltage device by the resistances R27 and R28 is applied produces a voltage KVC which is higher than the constant voltage Vc, which is applied to the inversing input terminal of the operational amplifier OP6 through the resistance R1. Between the inversing input terminals and the output terminal of the operational amplifier OP6 the diodes D1–D4 are connected in parallel.

MOS is the operational amplifier to whose non-inversing input terminal the output of the operational amplifier OP6 is applied, whereby between the input terminals of the operational amplifier MOS the light sensing element 54 shown in FIG. 1 is connected and the output of the operational amplifier MOS is logarithmically compressed by means of the logarithmically compressing diode D5. The output of the operational amplifier MOS is applied to the inversing input terminal of the operational amplifier OP5 through the temperature compensating resistance R4. To the inversing input terminal of the operational amplifier OP5 the compensation switch SW10 shown in FIG. 1 is connected through the resistance R2, whereby between the inversing input terminal and the output terminal the resistance R3 is connected. OP2 is the operational amplifier to whose inversing input terminal the resistance R7 is connected, whereby between the inversing input terminal and the output terminal of the operational amplifier OP2 the variable resistances 27 and 25 shown in FIG. 1 are connected in series. OP1AE is the operational amplifier to whose inversing input terminal the output of the operational amplifiers OP2 and OP5 are applied through the resistances R49 and R5, whereby the variable resistance 70 is connected to the inversing input terminal of the operational amplifier OP1AE is connected. R6 is the resistance connected between the input terminal and the output terminal of the operational amplifier OP1AE. Further, the output of the operational amplifier OP1AE is applied to the meter 57 through the resistance R10. The meter 57 is connected to the fixed contact NO of the change over switch SW8 through the resistance R48. R46 is the resistance connected to the resistance R48. The resistance R8 is connected to the operational amplifier OP1EF, between whose input terminal and whose output terminal the resistance R9 is connected. The operational amplifier OP1EF produces a signal corresponding to the shutter time of 1/60 sec. To this operational amplifier OP1EF the output of the comparator CP3 is applied through the inverter I20 and the resistance R41, while the output of the comparator CP3 is applied to the operational amplifier OP1AE through the resistance R40 in such a manner that either of the operational amplifiers OP1EF or OP1AE operates in accordance with the output of the comparator CP3. OP3UK is the operational amplifier to whose non-inversing input terminal the output of either the operational amplifiers OP1AE or OP1EF is delivered, being divided by means of the resistances R11 and R12 while OP3K is the operational amplifier, to whose input terminal the resistance R13 is connected, while between the input terminal and the output terminal the resistance R14 is connected in such a manner that the operational amplifier OP3K produces a voltage higher than the constant voltage Vc. The operational amplifier OP3UK operates when the high level signal is applied to from the output terminal ST0 of the decoder circuit DE1 of the status circuit, while the operational amplifier OP3K operates when the high level signal is applied to from the output terminal ST1 of the decoder DE1 of the status circuit. OP4 is the operational amplifier constituting a Miller integrator, whereby to the inversing input terminal of the operational amplifier OP4 the output of the operational amplifiers OP3UK and OP3K is applied through the resistance R15, while between the inversing input terminal and the output terminal the transistors TR1, TR2, the diode D6 and the condenser C1 are connected in parallel. To the base of the transistors TR1 and TR2 the output of the NAND gate N33 of the status circuit is applied through the resistances R20 and R19. CP5 is the comparator for comparing the output of the operational amplifier OP4 with the constant voltage Vc, delivering the high level signal to the NOR gate NR2 of the status circuit when the output of OP4 becomes lower than the constant voltage Vc.

CP2 is the voltage checking comparator for comparing the voltage divided with the resistances R16 and R17 with the constant voltage. The comparator CP2 delivers a low level signal to the NAND gates N13, N30 and N31 of the status circuit when the voltage Vcc becomes lower than the lowest guarantee voltage for controlling the camera.

CP1 is the comparator for producing the count start signal, whereby to the input terminal of the comparator CP1 the integrating circuit consisting of the resistance R18 and the condenser C2 is connected, while to the condenser C2 the switches SW4 and SW12 shown in FIG. 1 are connected in series. In consequence, when the count switch SW4 is in the closed state the condenser C2 is short circuited, while when the count switch SW4 is in the opened state the condenser C2 is charged until the terminal voltage of the condenser C2 reaches the constant voltage Vcc, when the level of the output of the comparator CP1 becomes low. Further, when the bulb switch SW12 is in the closed state the condenser C2 is not charged, whereby the level of the output of the comparator CP1 is kept high. The output of the comparator CP1 is delivered to the AND gate A2 and the NAND gate N28 of the status circuit.

56 is the accessory shoe shown in FIG. 1, where earth terminal TA is grounded and whose synchronization contact terminal TX is connected to the synchronization contact SWX, which is closed when the leading shutter curtain has run and opened when the tail shutter curtain has run. Further, the charge completion signal terminal TC is connected to the flash light switch SW60 and also to the input terminal of the comparator CP3, which input terminal is connected to the output terminal of the operational amplifier OP8 and to the transistor TR5. To the transistor TR5 the output of the NAND gate N34 of the status circuit is delivered through the inverter I26 and the resistance R30, while to the comparator CP3 the output of the NAND gate N34 is delivered through the resistance in such a manner that along with the oscillation of the output of the NAND gate N34 the transistor TR5 is repeatedly brought in the closed and the opened state. Hereby, when the transistor TR5 is in the closed state the comparator CP3 is non-operative so as to keep the level of the output of the comparator CP3 high. In consequence, the comparator CP3 operates only when the transistor TR5 is in the closed state. Hereby, if the flash light device has not been charged, the voltage KVC which is the output of the operational amplifier OP8 is applied to the comparator CP3 through the resistance R29, whereby the level of the output of the comparator CP3 is high. Further, when the flash light device has been charged, the device assumes the current from the charge completion signal terminal TC so that a current runs from the output terminal of the operational amplifier OP3 to the charge completion signal terminal TC through the resistance R29 so as to inverse the level of the output of the comparator CP3 into the low one. Further, when the switch SW60 is closed the level of the output of the comparator CP3 becomes low in the same way as in case of the charge completion. The output of the comparator CP3 is delivered to the operational amplifiers OP1AE and OP1EF as mentioned above and at the same time to the NAND gates N34, N52-N55 as well as to the AND gates A7-A11.

LED2 is the light emission diode for displaying the self timer mode, being connected to the transistor TR6 through the resistance R31, whereby to the base of the transistor TR6 the output of the OR gate OR3 of the status circuit is delivered through the resistance R32. P is the pulse generating circuit for producing pulses of 65.536 KHz, the output of which circuit is delivered to the input terminal CP of the counter C1 in the status circuit and further to the input terminal CP of the Flip-Flops F1-F10 through the inverter I6.

TR7 and TR8 are the transistors for constituting the power up clear circuit together with the resistances R36-R39, whereby the transistor TR8 is in the opened state until along with the voltage division by means of the resistances R36 and R37 the voltage Vcc reaches the lowest guarantee voltage, and therefore, the transistor TR7 is in the closed state so that the level of the output of the inverter I25 is high. The output of the inverter I25 is delivered to the OR gate OR4 and the NOR gate NR8 in the status circuit and also to the reset terminal R of the Flip-Flops F1-F3, F5-F9 as well as the set terminal S of the Flip-Flop F4 and further to the input terminal of the NAND gates N22, N27 through the inverter I3. When the voltage Vcc becomes higher than the lowest guarantee voltage, the transistor TR8 is brought into the switched on state, while the transistor TR9 is brought into the switched off state, whereby the level of the output of the inverter I25 becomes low.

Mg2 is the release magnet shown in FIG. 1. The magnet Mg2 is connected between the transistor TR3 and the connecting point of the resistance R22 with the condenser C4, whereby the base of the transistor TR3 is connected to the output terminal ST7 of the decoder DE1 in the status circuit through the resistance R21. In consequence, when the level of the output from the terminal ST7 of the decoder DE1 is low, the transistor TR3 is brought into the switched off state so as to charge the condenser C4, while when the level of the output from the terminal ST7 of the decoder DE1 is high, the transistor TR3 is brought into the switched on state so as to discharge the condenser C4 and supply current to the magnet Mg2.

Mg3 is the shutter control magnet Mg3 shown in FIG. 1, being connected to the transistor TR4, to whose base the output of the operational amplifier OP7 is delivered. To the non-inversing input terminal of the operational amplifier OP7 the output voltage KVC of the operational amplifier OP8 is delivered, being hereby divided by means of the resistances R23, R24 and R25 so as to supply a constant current to the magnet Mg3. Further, to the operational amplifier OP7 the output of the NOR gate NR9 of the status circuit is delivered through the inverter I21 and the resistance R44, in such a manner that when the level of the output of the NOR gate NR9 is low the output is inversed by means of the inverter and delivered to the operational amplifier OP7. R26 is the resistance connected to the transistor TR4 in such a manner that the level at the connecting point of the resistance R26 and the transistor TR4 is compared with the level of the voltage divided with the resistances R24 and R25 by means of the comparator CP4. The level of the output of the comparator CP4 is high when the constant current runs through the magnet Mg3, while when the level of the output current of the operational amplifier OP7 is set below a certain determined value the current running through the resistance R26 in case of the breakage of the magnet such as coil breakage can be kept small so as to keep the output of the comparator CP4 low. The output of the comparator CP4 is delivered to the NAND gates N13 and N30 in the status circuit.

Below the status circuit consisting of a digital circuit will be explained. N1–N60 are the NAND gates, A1–A16 the AND gates, NR1–NR11 the NOR gates, OR1–OR4 the OR gates, E1–E3 the exclusive OR gates, I1–I15 the inverters, F1–F10 the Flip-Flops, C1–C4 the counters, G1 and G2 the registers and DE1 and DE2 the decoders. The output of the NAND gates N1–N3 is delivered to the input terminal J of the Flip-Flop F1 through the NAND gate N16 and the output of the NAND gates N4–N8 to the input terminal K of the Flip-Flop F1 through the NAND gate N17. The output of the NAND gates N3, N7, N9, N10 and N14 is delivered to the input terminal J of the Flip-Flop F2 through the NAND gate N18. The output of the NAND gates N5, N11, N12 and N15 is delivered to the input terminal K of the Flip-Flop F2 through the NAND gate N19. The output of the NAND gates N6 and N15 is delivered to the input terminal K of the Flip-Flop F3 through the NAND gate N20. The output of the NAND gate N13 is delivered to the input terminal J of the Flip-Flop F3 through the inverter I12. The output of the NAND gates N16–N20 and the inverter I12 is delivered to the input terminal K of the Flip-Flop F4 through the NOR gate NR4, and at the same time to the input terminal J of the Flip-Flop F4 through the NOR gate NR4 and the inverter I4. The output terminals of the Flip-Flops F1–F3 are connected respectively the input terminals D of the Flip-Flops F5–F7 in such a manner that the outputs from the output terminals Q of the Flip-Flops F5–F7 are delivered to the input terminals A, B and C of the decoder DE1. To the terminal INH of the decoder DE1 the output from the output terminal Q of the Flip-Flop F4 is delivered. The output from the output terminal ST0 of the decoder DE1 is delivered to the operational amplifier OP3UK as mentioned above and at the same time to the NAND gates N1, N3, N9, NOR gate NR1 and OR gate OR1. The output from the output terminal ST1 of the decoder DE1 is delivered to the operational amplifier OP3K as mentioned above and at the same time to the NAND gates N4, N7 and N10, while the output from the output terminal ST1 is delivered to the reset terminal R of the Flip-Flop F10 and the NOR gate NR11 through the inverter I10 and further to the NAND gate N26 through the inverter I4. The output from the output terminal ST2 of the decoder DE1 is delivered to the NAND gates N2, N11 and N35 and to the NOR gates NR5 and NR6 through the inverter I7. The output from the output terminal ST3 of the decoder DE1 is delivered to the NAND gates N5 and N13 and the NOR gate NR9, while the output from the output terminal ST4 of the decoder DE1 is delivered to the NAND gates N14 and N49. The output from the output terminal ST5 of the decoder DE1 is delivered to the NAND gates N6, N8 and N29, while the output from the output terminal ST6 of the decoder DE1 is delivered to the NAND gate N15. The output from the output terminal ST7 of the decoder DE1 is delivered to the transistor TR3 through the resistance R21 as mentioned above and to the NAND gate N12. The output from the output terminal Q of the Flip-Flops F6 and F7 is delivered to the NAND gate N33, whose output is delivered to the transistors TR2, TR1 and TR10 respectively through the resistances R19, R20 and R35 as mentioned above and at the same time to the NAND gate N57 through the NOR gate NR3 and the inverter I9. The output from the output terminal Q of the Flip-Flops F2 and F3 is delivered to the AND gate A3 through the NAND gate N32, whereby to the AND gate A3 the output from the output terminal Q of the Flip-Flop F4 is also delivered. The output of the AND gate A3 is delivered to the OR gates OR2 and OR4. The NAND gates N21 and N22, N24 and N25, N26 and N27 and N28 and N29 are respectively connected to each other so as to constitute Flip-Flop circuit, while the NOR gates NR1 and NR2, NR8 and NR9 and NR10 and NR11 are connected to each other so as to constitute Flip-Flop circuit. To the NAND gate N21 the output of the NAND gates N4 and N11, whereby the output of the NAND gate N22 which constitutes a Flip-Flop circuit together with the NAND gate N21 is delivered to the AND gate A2. The output of the NAND gate N26 is delivered to the NAND gate N24, whose output is delivered to the AND gate A2. The output of the AND gate A2 is delivered to the input terminal D of the Flip-Flop 8, the output from whose output terminal Q is delivered to the NAND gates N3, N7, N9 and N10 and to the NAND gates N1 and N4 through the inverter I1. The output of the NOR gate NR1 and the NAND gates N28, N30 and N31 is respectively delivered to the NAND gates N4, N8, N5 and N11. The output from the output terminal Q of the Flip-Flop F4 is delivered to the reset terminal of the counter C1 and further to the NAND gate N59 through the inverter I5. The output of the NOR gate NR3 is delivered to the reset terminal R of the counter C2 through the OR gate OR2. To the input terminal CP of the counter C2 the output of 8192 Hz of the counter C1 is delivered. The counter C2 produces 12 kinds of signals from 4096 Hz to 2 Hz, out of which the signals from 4096 Hz to 4 Hz are respectively delivered to the NAND gates N38–N48. Hereby, the signal of 2 Hz is delivered to the NOR gate NR5. Further, the signal of 4 Hz of the counter C2 is delivered to the AND gate A1, the NAND gates N6, N35 and the NOR gate NR5, while the output of 8 Hz of the counter C2 is also delivered to the AND gate A1 and the NOR gate NR6. The output of the AND gate A1 is delivered to the NAND gate N24 through the NAND gate N23. The output with 16 Hz of the counter C2 is delivered to the NAND gate N15 and the NOR gate NR6. The outputs with 128 Hz and 512 Hz of the counter C2 are delivered also to the NAND gates N5, N12 and N13 through the AND gate A4. The output with 8192 Hz of the counter C1 is delivered to the NAND gates N37 and N57, while to the NAND gates N37–N48 the outputs from the output terminal Q0–Q11 of the decoder DE2 are respectively delivered. The output of the NAND gates N37–N48 are delivered to the NAND gate N36, whose output is delivered to the NAND gate N49. The output of the NAND gates N49 and N50 is delivered to the input terminal CP of the counter C4 through the NAND gate N51, and to the reset terminal R of the counter C4 the output of the OR gate OR4 is delivered. The outputs from the output terminals of the counter C4 are delivered to the NOR gate NR7 respectively through the exclusive OR gates E1–E3 and the inverter I11, whereby the output of the NOR gate NR7 is delivered to the NOR gate NR8 and the NAND gate N14. Further, the output from the output terminal Q3 of the counter C4 is delivered to the AND gate A2 and the NAND gate N50 through the inverter I15. The output of the NOR gate NR9 is delivered to the operational amplifier OP7 through the inverter I21 and the resistance R44 and at the same time to the AND gate A2. The output of the NAND gate N35 is delivered to the NAND gate N34 through the inverter I13 and the OR gate OR1 and further to the AND gate A5 and the input terminal CP of the counter C3 through the NAND gate N58. The outputs from the output terminals Q1–Q7 of the counter C3 are respectively delivered to the AND gates A12–A15 and further to the input terminals D6 and D7 of the register G2. Beside the output of the NAND gate N58 the output from the outputs terminals Q2, Q4 and Q7 of the counter C3 are delivered, while the output of the AND gate A5 is delivered to the NAND gate N1. The outputs from the output terminals Q4 and Q6 of the counter C3 are delivered to the AND gate A6, whose output is delivered to the NAND gate N2. The outputs from the output terminals Q4, Q5 and Q7 of the counter C3 are also delivered to the NAND gate N56, whose output is delivered to the NAND gate N58 through the NAND gate N57. The output from the output terminal Q6 of the counter C3 is delivered to the NOR gate NR5 and also to the NOR gate NR6 through the inverter I8, whereby the outputs of the NOR gates NR5 and NR6 are delivered to the OR gate OR3. The output from the output terminal Q5 of the counter C3 is delivered to the NOR gate NR10, while the output of the NOR gate NR11 which constitutes a Flip-Flop circuit together with the NR gate NR10 is delivered to the input terminal D of the Flip-Flop F10 and the NAND gate N60. The output from the output terminal Q of the Flip-Flop F10 is delivered to the NAND gate N60, whose output is delivered to the reset terminal R of the counter C3 through the NAND gate N59. The output from the output terminal Q of the Flip-Flop F10 is delivered to the AND gates A12–A16, whose outputs are respectively delivered to the input terminals D1–D3 of the register G1 and the input terminals D4 and D5 of the register G2. The output of the NAND gate N4 is delivered to the input terminal D of the Flip-Flop F9 through the inverter I14, while the output from the output terminal Q of the Flip-Flop F9 is delivered to the NAND gate N50 and the input terminal CP of the registers G1 and G2. The digital outputs of the register G2 are the shutter times in multiples 2 from 1/1000 sec. to 2 sec. as is shown in Table 1.

TABLE 1

| D4 | D5 | D6 | D7 | Shutter Time | TV |
|----|----|----|----|--------------|-----|
| 0 | 0 | 0 | 0 | 1/1000 | 10 |
| 1 | 0 | 0 | 0 | 1/500 | 9 |
| 0 | 1 | 0 | 0 | 1/250 | 8 |
| 1 | 1 | 0 | 0 | 1/125 | 7 |
| 0 | 0 | 1 | 0 | 1/60 | 6 |
| 1 | 0 | 1 | 0 | 1/30 | 5 |
| 0 | 1 | 1 | 0 | 1/15 | 4 |
| 1 | 1 | 1 | 0 | $\frac{1}{8}$ | 3 |
| 0 | 0 | 0 | 1 | $\frac{1}{4}$ | 2 |
| 1 | 0 | 0 | 1 | $\frac{1}{2}$ | 1 |
| 0 | 1 | 0 | 1 | 1 | 0 |
| 1 | 1 | 0 | 1 | 2 | $-1$ |

As can be understood from the Table 1, all the times shorter than 1/1000 sec. is converted into 1/1000 sec., while all the times longer than 2 sec. is converted into 2 sec. Namely, in case of the time shorter than 1/1000 sec. the level of the output from the output terminal Q0 of the decoder DE2 is high, while in case of the time longer than 2 sec., the level of the output from the output terminal Q11 of the decoder DE2 is high.

Further, the digital output of the register G1 is in the precision of $\frac{1}{8}$ step as is shown in Table 2.

TABLE 2

| D1 | D2 | D3 | TV |
|----|----|----|-----|
| 0 | 0 | 0 | 8/8 |
| 1 | 0 | 0 | $\frac{7}{8}$ |
| 0 | 1 | 0 | 6/8 |
| 1 | 1 | 0 | $\frac{5}{8}$ |
| 0 | 0 | 1 | 4/8 |
| 1 | 0 | 1 | $\frac{3}{8}$ |
| 0 | 1 | 1 | 2/8 |
| 1 | 1 | 1 | $\frac{1}{8}$ |

Those shown in Table 2 are respectively positioned between TV10—1 shown in FIG. 1. In consequence, in case of 1/1000 sec. the levels at the output terminals D1–D3, D4–D7 of the registers G1 and G2 are all low, namely "0". In case of a time longer than 1/1000 sec. by $\frac{1}{8}$ sec., the level at the output terminal D1 of the register D1 is high, namely "1", while the levels at the output terminals D2, D3, D4–D7 of the registers G1 and G2 are all "0".

The outputs from the output terminals D1–D3, D4–D7 of the registers G1 and G2 are delivered to the NAND gate N55, the AND gates A7–A10, the NAND gate N54 and the AND gate A11. The output of the NAND gate N55 is delivered to the exclusive OR gate E1 through the NAND gate N52, while the outputs of the AND gates A7 and A8 are respectively delivered to the exclusive OR gates E2 and E3. The outputs of the AND gates A9–A11 are respectively delivered to the input terminals A, B and D of the decoder DE2, while the output of the NAND gate N54 is delivered to the input terminal C of the decoder DE2 through the NAND gate N53. The outputs from the output terminals Q0–Q11 of the decoder DE2 are respectively delivered to the NAND gates N37–N48.

Figure 3:
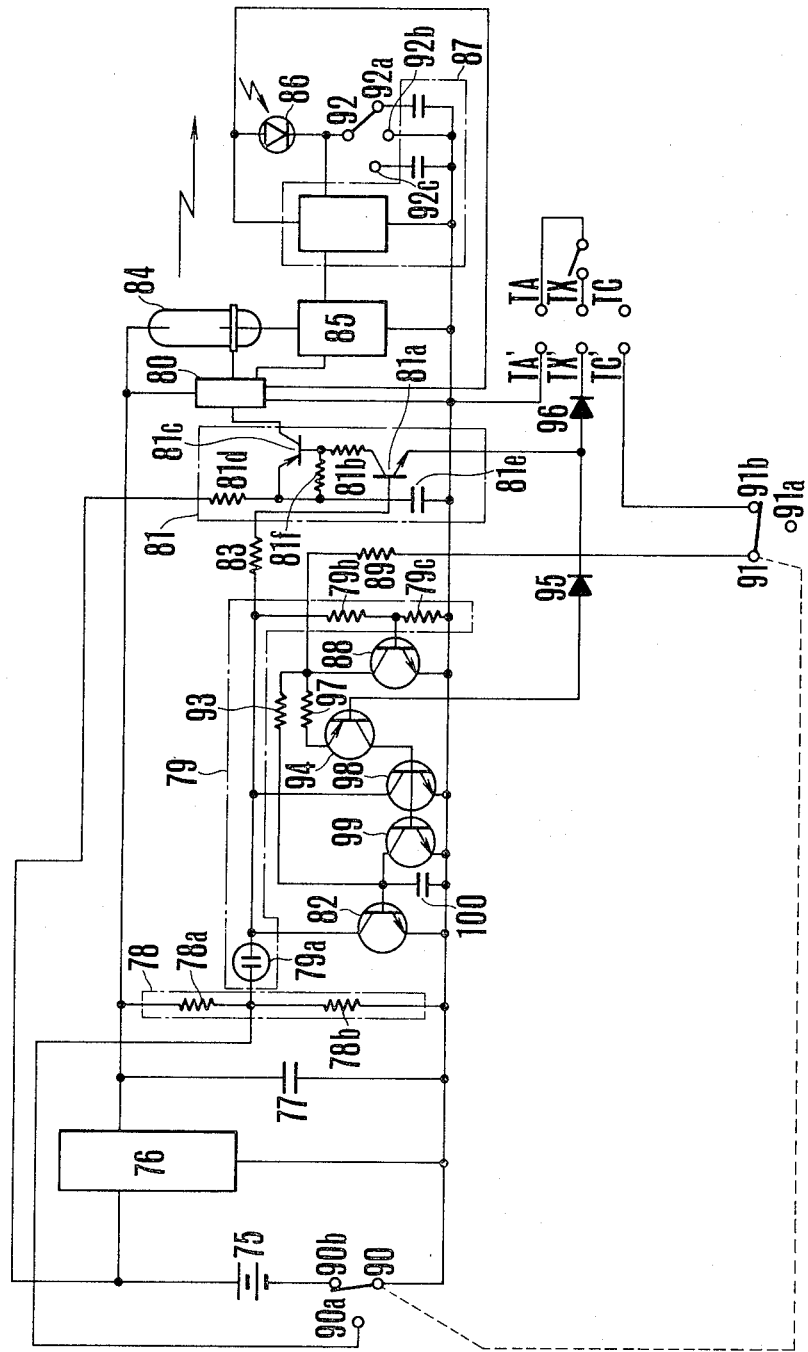
FIG. 3 shows the circuit of the speed light device to be mounted on the camera shown in FIGS. 1 and 2.

FIG. 3 shows the circuit of the exclusive speed light device to be mounted on the camera shown in FIGS. 1 and 2. In the drawing, 75 is the power source, 76 the voltage step up circuit for raising the source voltage, 77 the flash light energy storing main condenser and 78 the voltage detecting circuit for detecting the voltage between the terminals of the main condenser 77, consisting of the voltage dividing resistances 78a and 78b. 79 is the conventional display circuit for displaying the charge completion when the main condenser has been charged up to the predetermined voltage, consisting of a neon tube 79a, the voltage dividing resistances 79b and 79c and so on. 80 is the trigger circuit and 81 the operation circuit for the trigger circuit 80. The circuit 81 is constituted as follows. To the neon tube 79a of the display circuit 79 the base of the transistor 81a is connected through the resistance 83, whereby the emitter of the transistor 81a is connected to the terminal TX' through the diode 96. The collector of the transistor 81a is connected to the base of the transistor 81c, whose collector is connected to the trigger circuit 80. Further, the emitter of the transistor 81c is connected to the connecting point of the resistance 81d and the condenser 81e connected in series with the power source 75, whereby the connecting point is connected to the base of the transistor 81c through the resistance 81f. The operation control circuit constituted as mentioned above operates the trigger circuit 80 only when the display circuit 79 is in the operative state, the transistors 82 and 94 to be explained later are in the opened state and the synchronization contact SWX is closed. 84 is the flash light discharge tube for producing a flash light in accordance with the trigger signal from the trigger circuit 80. 85 is the conventional discharge control circuit connected in series with the flash light discharge tube 84, consisting of a thyristor and condenser connected in series with the discharge tube 84. 86 is the light sensing element such as photo cell for sensing the reflected flash light from the flash light discharge tube. 87 is the integrating circuit for integrating the output of the light sensing element 87, constituting a conventional light adjusting circuit together with the light sensing element 86. 88 is the transistor whose base is connected to the voltage dividing point of the resistances 79b and 79c of the display circuit 79 and brought into the closed state when the neon tube 79a of the display circuit 79 is put on. 89 is the resistance for transmitting the charge completion signal to the control circuit. 90 is the power source switch to be selectively connected to the terminals 90a or 90b. 91 is the change over switch operatively connected to the switch 90 so as to change over the terminals 91a and 91b. 92 is the change over switch for selectively changing over the operation of the light adjusting circuit, selectively changing over the terminals 92a, 92b and 92c. TA' is the earth terminal connected to the terminal TA of the camera, TX' the synchronization contact terminal connected to the synchronization contact terminal TX of the camera and TC' the charge completion signal terminal connected to the charge completion signal terminal TC of the camera. 93 is the resistance connected between the collector of the transistor 88 and the base of the transistor 82. The collector of the transistor 82 is connected to the low voltage side of the neon tube 79a, while the base of the transistor 94 is connected to the terminal TX' through the diodes 95 and 96, while the emitter is connected to the collector of the transistor 88 through a high ohmic resistance 97 and the collector is connected to the base of the transistors 98 and 99. The collector of the transistor 99 is connected to the base of the transistor 82, while the collector of the transistor 98 is connected to the collector of the transistor 82. 100 is the condenser connected to the base of the transistor 82.

Figure 4:
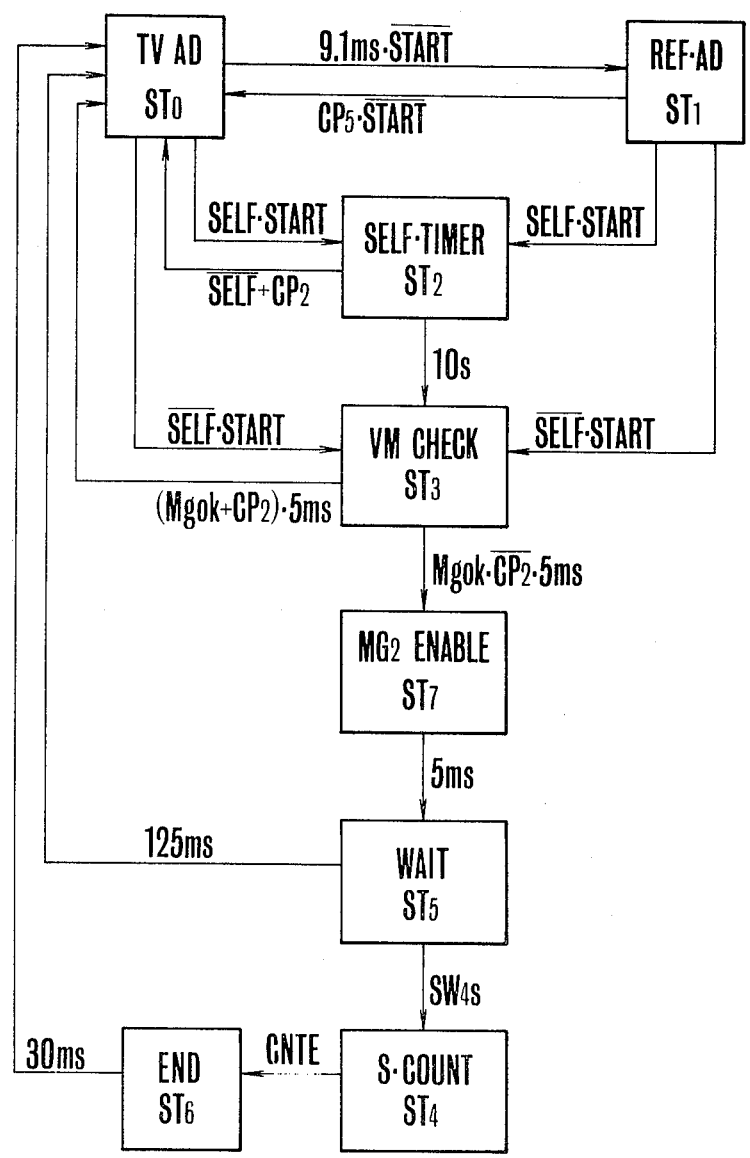
FIG. 4 shows the explanation drawing for the circuit shown in FIG. 2.
Figure 5:
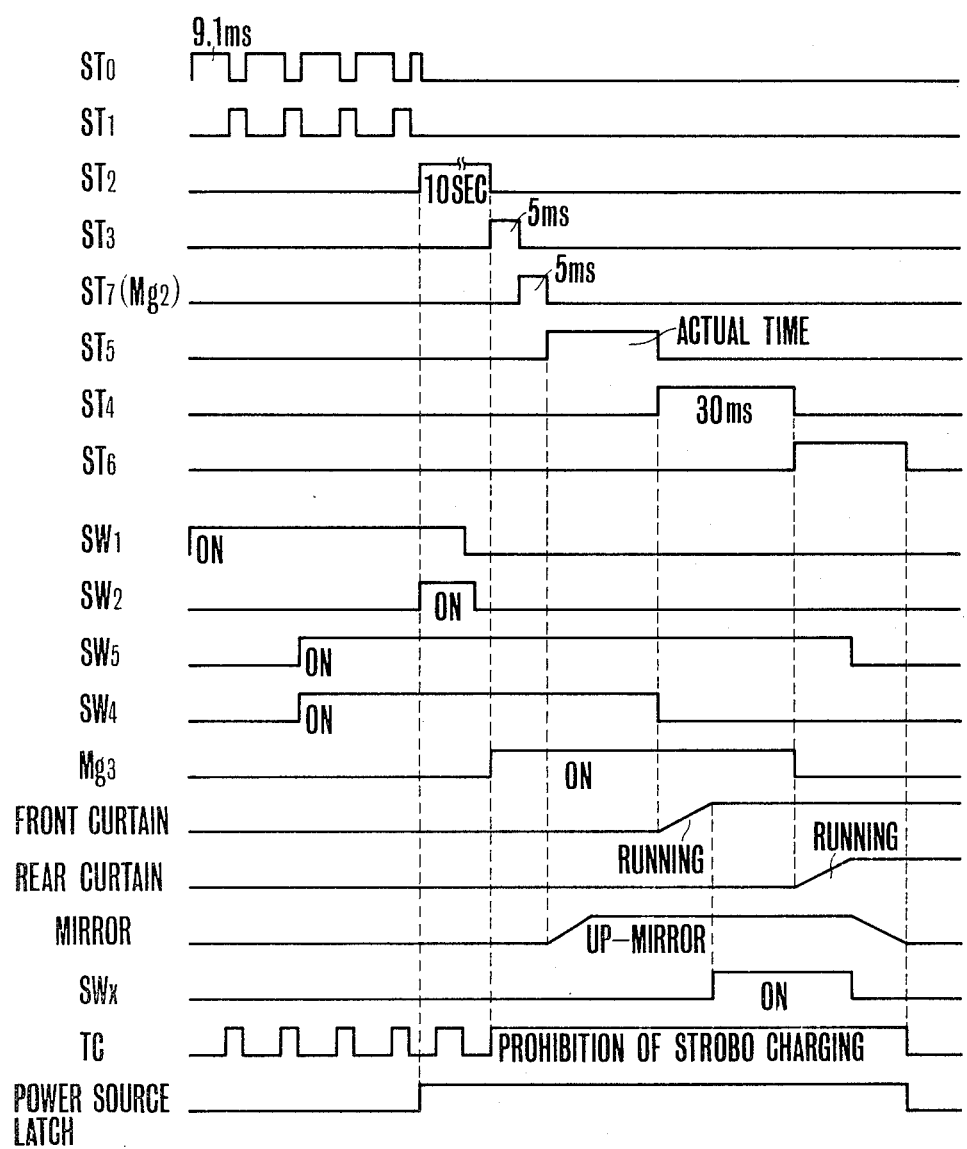
FIG. 5 shows the wave forms at various parts of the circuit shown in FIGS. 2A and 2B.

The operation of the above mentioned construction will be explained in accordance with FIGS. 4 and 5. FIG. 4 shows the flow chart of the camera operation, while FIG. 5 shows the time chart of various parts.

FIG. 2 shows the wound up state. Thus, the count switch SW4 and the winding up completion switch SW5 shown in FIG. 3 are closed. Further, the value of the variable resistance 27 is decided along with the rotation of the lever 26 in accordance with the length of the totally opened diaphragm compensating pin 28 of the photographing lens to be mounted. When the figure on the dial 66 is set at the index 67 in accordance with the sensitivity value of the film to be loaded in the camera, the value corresponding to the film sensitivity is set at the variable resistance 70.

To begin with, the automatic exposure photography with priority on the aperture value in the above mentioned state will be explained below.

When at first the mode change over dial 59 is rotated and the mark A for the automatic exposure on the dial at the index 60, the brushes 64a and 64b are not brought into contact with the conductor patterns 63a, 63b and 63c so that the bulb switch SW12, the self timer switch SW7 and the flash light switch SW60 are in the opened state. When further the aperture setting ring 1 is rotated so as to set the desired aperture value on the ring at the index 2, the aperture preset ring 3 is rotated by means of the spring 3a, following the rotation of the ring 1. The rotation of the preset ring 3 is transmitted to the lever 24 through the signal lever 29 in such a manner that the value corresponding to the set aperture value is set at the variable resistance 25. The change over switch SW3 is in contact with the fixed contact NC because the battery check button 71 is not pressed.

When then the release button 58 is pressed, along with the first stroke of the release button 58 the switch SW1 is closed so as to bring the transistor TR9 in the closed state. In this way the voltage Vcc is applied to the control circuits such as operational amplifier, gates and so on, whereby the initial clear up of the circuit is carried out by means of the power up clear circuit until the voltage Vcc is higher than the lowest guarantee voltage of the circuits. Namely, because when the switch SW1 is closed the voltage Vcc is lower than the lowest guarantee voltage, because of the voltage dividing by means of the resistances R36 and R37, the transistor TR8 is in the opened state, the transistor TR7 in the closed state and the level of the output of the inverter I25 is high, whereby the level of the output of the NAND gate N22 which constitutes a Flip-Flop circuit together with the NAND gate N21 becomes high, while the level of the output of the NOR gate NR9 which constitutes a Flip-Flop circuit together with the NOR gate NR8 becomes high. Hereby, the level of the output of the NAND gate N26 which constitutes a Flip-Flop circuit together with the NAND gate N27 becomes low. Hereby, the level of the output of the NAND gate N24 which constitutes a Flip-Flop circuit together with the NAND gate N23 is kept high, because the level of the output of the NAND gate N26 is low while the low level signal in accordance with the closing of the winding up completion switch SW5 is inverted by means of the inverter I23. By means of the high level output of the inverter I25 the counter C4 as well as the Flip-Flops F1–F3 and F5–F9 are reset and the Flip-Flop F4 is set. Thus, the levels of the outputs from the output terminals of the decoder DE1 are made low while the counters C1 and C3 are reset. Because at this time the levels of the outputs of the decoder DE1 are all low, the levels of the outputs of the NAND gates N1–N15 are all high, so that the levels of the NAND gates N16–N20 as well as the inverter I12 are all low. Thus, the outputs of the NOR gate NR4 are high. When then the voltage Vcc is higher than the lowest guarantee voltage, the transistor TR8 is brought into the closed state, while to transistor TR7 is brought into the opened state so that the level of the inverter I23 becomes low. Thus, the Flip-Flops F1–F3 as well as F5–F9 and counter C4 which have been reset are released, while the Flip-Flop F4 which has been set in released, whereby the Flip-Flop F4 is inverted by means of the output of the NOR gate NR4 in synchronization with the rising up of the oscillation pulse so that the level of the output at the output terminal becomes low. Thus, the counters C1 and C3 which have been reset are released so as to be in a position to accept the input signal from the decoder DE1. To all of the input terminals A, B and C of the decoder DE1 low level signals are delivered so that the level from the output terminal ST0 of the decoder DE1 becomes high. Thus, the operational amplifier OP3UK operates. On the other hand along with the closing of the power source switch SW1 the voltage is applied to all the operational amplifier so that the operational amplifier OP2 produces an aperture information in accordance with the set aperture value as well as the totally opened aperture compensation information to be delivered to the operational amplifier OP1AE. At the same time the output voltage KVC from the operational amplifier OP8 is delivered to the inverting input terminal of the temperature compensation operational amplifier OP6, whose output is delivered to the non-inverting input terminal of the light measuring operational amplifier MOS. Thus, the influence due to the saturation current along the reversed direction of the logarithmically compressing diode D5 subject to the variation of the temperature is eliminated in such a manner that the light measuring operational amplifier MOS produces a voltage corresponding to the object brightness. The output of the operational amplifier MOS is delivered to the operational amplifier OP1AE through the temperature compensation resistance R4 and the operational amplifier OP5. To this operational amplifier OP1AE the film sensitivity information is given by means of the variable resistance 70. Consequently, the film sensitivity information, the brightness information, the aperture value information and the totally opened aperture compensation information are delivered to the operational amplifier OP1AE, which calculates all of the above mentioned informations so as to produce a voltage corresponding to the proper shutter time. The output of the operational amplifier OP1AE is delivered to the metre 57 to display the proper shutter time. Further, the output of the operational amplifier OP1AE is delivered to the operational amplifier OP3UK, by means of whose output the condenser C1 is charged in such a manner that the output of the operational amplifier OP4 becomes higher than the voltage VC.

Further, the output with 65.536 KHz from the pulse producing circuit P is delivered to the counter C1, which counts in synchronization with the falling down of the pulse from the pulse generator P. The output pulse with 8192 Hz of the counter C1 is delivered to the NAND gate N57. At this time the level of the output of the NAND gate N33 is low because the level of the outputs of the output terminals $\bar{Q}$ of the Flip-Flops F6 and F7 are high. The output of the NAND gate N33 is inverted by means of the inverter I9 and delivered to the NAND gate N57. The levels of the outputs from the output terminals Q4, Q5 and Q7 of the counter C3 are low and therefore the level of the output of the NAND gate N56 is high. Thus, the output pulse with 8192 Hz of the counter C1 is delivered to the counter C3 through the NAND gates N57 and N58, whereby the counter C3 counts in synchronization with the falling down of the pulse with 8192 Hz. When the level of the outputs from the output terminals Q2, Q4 and Q7 of the counter C3 is high, while the level of the output with 8192 Hz is high, namely when 8192 Hz have been counted for 74.5 clock (74.5=0.5+2+8+64), namely, after the lapse of about 9.1 ms (hereinafter millisecond is called ms), the level of the output of the AND gate A5 becomes high. This output of the AND gate A5 is delivered to NAND gate N1. At this time the level of the output of the output terminal ST0 of the decoder DE1 is high, while the level of the output at the output terminal Q of the Flip-Flop F8 is low because the level of the output of the AND gate A2 is not yet high, whereby this low level signal at the output terminal Q of the Flip-Flop F8 is inverted by means of the inverter I1 and delivered to the NAND gate N1. Thus, the output of the AND gate A5 is delivered to the NAND gate N1 in such a manner that the level of the output of the NAND gate N1 becomes low, while the level of the output of the NAND gate N16 becomes high. The high level output of the NAND gate N16 is delivered to the input terminal J of the Flip-Flop F1 and further to the input terminal J of the Flip-Flop F4 through the NOR gate NR4 and the inverter I4. Thus, the levels of the outputs of the output terminals of the Flip-Flops F1 and F4 become high in synchronization with the rising up of the pulse inverted by means of the inverter I6. Thus, the levels of all of the outputs of the decoder DE1 become low, the level of the output of the NAND gate N1 becomes high and the levels at the input terminals J and K of the Flip-Flops F1–F3 become low. However, the levels at the output terminals Q of the Flip-Flops F1 and F4 are kept high. At the same time by means of the high level output at the terminal Q of the Flip-Flop F4 the counters C1 and C3 are reset. At the same time when the level of the output at the output terminal Q of the Flip-Flop F5 becomes high in synchronization with the rising up of the pulse inverted by means of the inverter I6, the level of the output at the output terminal Q of the Flip-Flop F5 becomes low. Thus, at the same time when the level at the output terminal ST1 of the decoder DE1 becomes high, the counters C1 and C3 which have been reset are released. Thus, the transient operation since the level at the output terminal ST0 of the decoder DE1 is high till the level at the output terminal ST1 becomes high is terminated. At this time, the levels at the output terminals of the Flip-Flops F1 and F5 are kept high. In this way, the level at the output terminal ST1 of the decoder DE1 becomes high after all of the levels of the outputs of the decoder DE1 are low for one pulse after the one pulse delay after 9.1 ms has been elapsed. This is to prohibit all other signals when one signal is accepted and the same thing can be said of other signal. By means of the high level signal from the output terminal ST1 of the decoder DE1 the level of the output of the NAND gate N26 becomes high, whereby the level of the output of the NAND gate N24 is kept high. At the same time the high level output of the output terminal ST1 of the decoder DE1 is applied to the NAND gate N4 and also to the operation amplifier OP3K. Thus, the operation amplifier OP3K operates so as to discharge the condenser C1. Thus the output voltage of the operational amplifier OP4 is lowered until it becomes equal to the voltage Vcc, when the level of the output of the comparator CP5 becomes high. The high level output of the comparator CP5 is delivered to the NOR gate NR2, while the level of the output of the NOR gate NR1 which constitutes a Flip-Flop together with the NOR gate NR2 becomes high and is delivered to the NAND gate N4. At this time to the NAND gate the low level output of the Flip-Flop is delivered through the inverter I1, so that the level of the output of the NAND gate N4 becomes low. The low level output of the NAND gate N4 is delivered to the input terminal D of the Flip-Flop F9 through the inverter I14 and also to the NAND gate N17, whose output is delivered to the input terminal K of the Flip-Flop F1 and further to the input terminal J of the Flip-Flop F4 through the NOR gate NR4 and the inverter I3. Consequently, the level at the output terminal Q of the Flip-Flop F9 becomes high in synchronization with the rising up of the pulse inverted by means of the inverter I6, while the level at the output terminal Q of the Flip-Flop F1 becomes low and the level at the output terminal Q of the Flip-Flop F4 becomes high. Thus, all of the levels of the outputs of the decoder DE1 become low, the level of the output of the NAND gate N4 becomes high and the levels at the input terminals J and K of the Flip-Flops F1–F3, when at the same time the level at the input terminal D of the Flip-Flop F9 becomes low. Thus, the output at the output terminal Q of the Flip-Flop F9 is at the high level for one pulse and delivered to the counter C4 through the NAND gates N50 and N51. On the other hand, the level at the output terminal Q of the Flip-Flop F4 is kept high so as to reset the counters C1 and C3. Then, along with the rising up of the pulse inverted by means of the inverter I6 the level of the output at the output terminal of the Flip-Flop F4 becomes low. Thus, the level at the output terminal ST0 of the decoder DE1 becomes high so as to release the counters C1 and C3 which have been reset. Thus, the operation since the level at the output terminal ST1 of the decoder DE1 till the level at the output terminal ST0 becomes high is completed.

In this way the level at the output terminal ST0 of the decoder DE1 becomes high and the above operation is repeated. Namely, while the switch SW1 is in the closed state, the level at the output terminals ST0 and ST1 of the decoder DE1 becomes alternatively high. Namely, the analog-to-digital conversion is repeated, whereby the time during which the output at the output terminal ST1 of the decoder DE1 is high is the analog-to-digital conversion value. When the above operation is repeated four times the level of the output at the output terminal Q3 of the counter C4 becomes high and delivered to the AND gate A2. After then, the release operation is possible at any time. Further, the high level output at the output terminal Q3 of the counter C4 is delivered to the NAND gate N50 through the inverter I15 so as to prohibit the counter C4 to accept the output pulse from the output terminal Q of the Flip-Flop C4.

As soon as the level of the output at the output terminal ST1 of the decoder DE1 has become high the counter C3 which has been reset is released and starts to count the output pulses with 8192 Hz from the counter C1 through the NAND gates N57 and N58. When the level of the output at the output terminal Q5 of the counter C3 becomes high, the high level signal is delivered to the NOR gate NR10, whereby the level of the output of the NOR gate NR11 which constitutes a Flip-Flop circuit together with the NOR gate NR10 becomes high. The high level output of the NOR gate NR11 is delivered to the input terminal D of the Flip-Flop F10 and the NAND gate N60. At this time the high level output at the output terminal ST1 of the decoder DE1 is inverted by means of the inverter I10 and delivered to the Flip-Flop F10 so as to release the Flip-Flop F10 which has been reset. At this time the output of the Flip-Flop F10 is not inverted and the level of the output at the output terminal $\overline{Q}$ is kept high. Thus the level of the output of the NAND gate N60 becomes low and is delivered to the reset terminal R of the counter C3 through the NAND gate N60 so as to reset the counter C3. The Flip-Flop F10 is inverted with the rising up of the pulse through the inverter I6 so that the level at the output terminal $\overline{Q}$ becomes low after the lapse of one pulse after a high level has been delivered to the input terminal D, whereby the level at the output terminal Q becomes high. Consequently, the counter C3 which has been reset is released, while the AND gate Flip-Flops A12–A16 are opened. Hereby, the counter C3 starts to count the output pulses with 8192 Hz. All of the outputs of the counter C3 are delivered directly to or indirectly to the registers G1 and G2 and the input terminals D1–D3, D4–D7 through the AND gates A1-2–A16. Further, as mentioned above, as the level of the output of the comparator CP5 is inverted into high level, by means of the high level output at the output terminal Q of the Flip-Flop F9 the register circuits G1 and G2 latch the contents of the counter C3, while at the same time the counter C3 is set by means of the high level output at the output terminal Q of the Flip-Flop F4.

When then the release button 58 is further pushed so as to close the release switch SW2, a low level signal in accordance with the closing of the switch SW2 is inverted by means of the inverter I22 and delivered to the AND gate A2. At this time to the AND gate A2 a high level output from the output terminal Q3 of the counter C4 is delivered and further the high level output of the comparator CP1 is also delivered because the count switch SW4 has been closed. The high level output of the NAND gate N22 set in the initial state by means of the output of the inverter I25 and the high level output of the NOR gate NR9 are delivered to the AND gate A2. The level of the NAND gate N26 is made low by means of the high level output of the inverter I25 and then, after the lapse of 9.1 ms, made high level by means of the high level output at the output terminal ST1 of the decoder DE1. Because at first the level of the NAND gate N25 is low, the low level signal in accordance with the closing of the switch SW3 is inverted by means of the inverter I23 and delivered to the NAND gate N25 when the switch SW1 is closed, so that the level of the output of the NAND gate N24 becomes high and delivered to the AND gate A2. When thus, the switch SW2 is closed, the output of the AND gate A2 becomes of high level and delivered to the Flip-Flop F8, whose output becomes of high level in synchronization with the rising up of the pulse inverted by means of the inverter I6. The high level output of the Flip-Flop F8 is delivered to the NAND gates N3 and N10, to which NAND gates N3 and N10 the high level signal in accordance with the closing and the opening of the self timer switch SW7 is delivered through the inverters I24 and I2. To the NAND gate N3 the output from the output terminal ST0 of the decoder DE1 is delivered, while to the NAND gate N10 the output of the output terminal ST1 of the decoder DE1 is delivered, so that the output of the NAND gate N3 becomes of low level, when the output of the Flip-Flop F8 becomes of high level in case the output of the output terminal ST0 of the decoder DE1 is of high level, while the output of the NAND gate N10 becomes of low level when the output of the Flip-Flop F8 becomes of high level in case the output of the output terminal ST1 of the decoder DE1 is of high level. When the level of the output of the NAND gate N3 becomes low, the outputs of the NAND gates N16 and N18 become of high level and delivered to the input terminal J of the Flip-Flops F1 and F2 and further to the input terminal J of the Flip-Flop F4 through the NOR gate NR4 and the inverter I3. Consequently, the levels of the output terminals Q of the Flip-Flops F1, F2 and F4 become high in synchronization with the rising up of the pulse inverted by means of the inverter I6, while the level of the output of the output terminal Q becomes low. Thus, the counter C2 is reset, while at the same time, the levels of all of the outputs of the decoder DE1 become low, whereby the level of the output of the NAND gate N3 becomes high, while the levels at the input terminals J and K of the Flip-Flops F1, F2 and F4 become low. However, the levels at the output terminals Q of the Flip-Flops F1, F2 and F4 are kept high. At the same time when the levels at the output terminals Q of the Flip-Flops F5 and F6 become high in synchronization of the next pulse inverted by means of the inverter I6, the level of the output at the output terminal $\overline{Q}$ of the Flip-Flop F4 becomes low. Thus, the counter C2 which has been reset is released, while the level at the output terminal ST3 of the decoder DE1 becomes high. Further, when the level of the output of the NAND gate N10, the NAND gate N18 delivers a high level signal to the input terminal J of the Flip-Flop F2 and also the input terminal J of the Flip-Flop F4 through the NOR gate NR4 and the inverter I3. Thus, the levels of the outputs at the output terminals Q of the Flip-Flops F2 and F4 become high in synchronization with the rising up of the pulse inverted by means of the inverter I6, while the level of the output at the output terminal Q becomes low. Thus, the counter C2 is reset, while at the same time the levels of all the outputs of the decoder DE1 become low, whereby the level of the NAND gate N10 becomes high, while the levels at the input terminals J and K of the Flip-Flops F1-F3 become low. However, the levels at the output terminals Q of the Flip-Flops F2 and F4 are kept high, while the level at the output terminal Q of the Flip-Flop F1 is kept high. Consequently, at the same time when the levels at the output terminals of the Flip-Flops F5 and F6 become high in accordance with the rising up of the next pulse inverted by means of the inverter I6 the level of the output at the output terminal Q of the Flip-Flop F4 becomes low. Consequently, the counter C2 which has been reset is released, while the level of the output at the output terminal ST3 of the decoder DE1 becomes high. Thus, the level of the output at the output terminal ST3 of the decoder DE1 becomes high when the output of the Flip-Flop F8 becomes high in case the level at either one of the output terminals ST0 or ST1 of the decoder DE1 is high.

By means of the high level signal at the output signal ST3 of the decoder DE1 the level of the output of the NOR gate NR9 is made low and the operational amplifier OP7 is made to operate so as to supply current to the magnet Mg3. Further, the high level output at the output terminal ST3 of the decoder DE1 is delivered to the NAND gates N5 and N13. To the NAND gate N5 the outputs of the comparators CP2 and CP4 are delivered through the NAND gate N30 and also the outputs with 128 Hz and with 512 Hz of the counter C2 are delivered through the AND gate A4, while to the NAND gate N13 the outputs of the comparators CP2 and CP4 are delivered and also the outputs with 128 Hz and 512 Hz of the counter C2 are delivered through the AND gate A4. Consequently, the output with 128 Hz and that with 512 Hz of the counter C2 are treated in AND operation, the output of the AND gate A4 becomes of high level and delivered to the NAND gates N5 and N13, which takes place when 5 ms has elapsed after the level of the output at the output terminal ST3 of the decoder DE1 has become high. In case at this time the output of either of the comparators CP2 and CP4 is low, namely either the voltage Vcc is lower than the lowest guarantee voltage for controlling the camera or the magnet Mg3 is inferior, the output of the NAND gate N5 becomes low in level and is delivered to the NAND gates N17, N19 and N21, in such a manner that the output of the NAND gate N22 which constitutes a Flip-Flop circuit together with the NAND gate N21 becomes low in level and is delivered to the AND gate A2 so as to disable the AND gate A2. At the same time the high level signals of the NAND gates N17 and N19 are delivered to the input terminals K of the Flip-Flops F1 and F2 and also to the input terminal J of the Flip-Flop F4 through the inverter I3. In consequence, the output at the output terminal Q of the Flip-Flops F1 and F2 becomes low in level in synchronization with the rising up of the pulse inverted by means of the inverter I6, while the output at the output terminal Q of the Flip-Flop F4 becomes high in level. By means of the high level output at the output terminal Q of the Flip-Flop F4 the outputs of the decoder DE1 become all low in level. However, the levels at the output terminals Q of the Flip-Flops F1 and F2 are kept low, while the level at the output terminal Q of the Flip-Flop F4 is kept high. At the same time, when the levels at the output terminals Q of the Flip-Flops F5 and F6 become low in synchronization with the rising up of the next pulse inverted by means of the inverter I6, the output at the output terminal Q of the Flip-Flop F4 becomes low in level. In consequence, the level at the output terminal ST0 of the decoder DE1 becomes high, whereby the output of the AND gate A2 does not become high because the level of the output of the NAND gate N22 is not low so that even if the switch SW2 is closed the next operation does not start so as to prohibit the release operation of the camera. Further, when the voltage Vcc is higher than the lowest guarantee voltage for the control of the camera and the magnet Mg3 is not out of order, the outputs of the comparators CP2 and CP4 are high in level and the output of the NAND gate N13 is low in level. The low level output of the NAND gate N13 is inverted by means of the inverter I12 and delivered to the input terminal J of the Flip-Flop F3, while the output of the inverter I12 is delivered to the input terminal J of the Flip-Flop F4 through the NOR gate NR4 and the inverter I3. Thus, the outputs at the output terminals Q of the Flip-Flops F3 and F4 become high in level in synchronization with the rising up of the pulse inverted by means of the inverter I6, while the output at the output terminal Q of the Flip-Flop F3 becomes low in level. Thus, the counter C2 is reset, while at the same time the outputs of the decoder DE1 become all low in level. However, the output terminal Q of the Flip-Flop F3 is kept in high level, while the output terminals Q of the Flip-Flops F1 and F3 are also kept in high level. Consequently, the levels at the output terminals Q of the Flip-Flops F5, F6 and F7 become high in level in synchronization with the rising up of the next pulse inverted by means of the inverter I6, while at the same time the output at the output terminal Q of the Flip-Flop F4 becomes low in level so as to release the counter C2 which has been reset. Thus, the output at the output terminal ST7 of the decoder DE1 becomes high in level and delivered to the NAND gate N12 and to the transistor TR3. To the NAND gate N12 the outputs with 128 Hz and 512 Hz of the counter C2 are delivered, whereby the output of the NAND gate N12 becomes low in level, while the output of the NAND gate N19 becomes high in level after the lapse of 5 ms after the high level output from the output terminal ST7 of the decoder DE1 has been delivered. The high level output of the NAND gate N19 is delivered to the input terminal of the Flip-Flop F2 and also to the input terminal J of the Flip-Flop F4 through the NOR gate NR4 and the inverter I3. Thus, the output at the output terminal Q of the Flip-Flop F2 becomes low in level in synchronization with the rising up of the pulse inverted by means of the inverter I6, while the output at the output terminal Q of the Flip-Flop F4 becomes high. By means of the high level output of the output terminal Q of the Flip-Flop F4 the outputs of the decoder DE1 become all low in level. However, the output terminal Q of the Flip-Flop F2 is kept in low level, the output terminal Q of the Flip-Flop F4 in high level and the output terminals Q of the Flip-Flops F1 and F3 are kept in high level. In consequence, the counter C2 is reset. In accordance with the rising up of the next pulse inverted by means of the inverter I6, the level at the output terminal Q of the Flip-Flop F6 becomes low, while the output of the output terminal Q of the Flip-Flop F4 becomes low. Thus, the output terminal ST5 of the decoder DE1 becomes in high level, while at the same time the counter C2 which has been reset is released. In consequence, the level of the output at the output terminal ST7 of the decoder DE1 is kept at high level for 5 ms. Thus, the transistor TR3 remains in the switched on state for 5 ms in such a manner that the current discharged from the condenser C3 is supplied to the release magnet Mg2. Thus, the magnetic flux produced by means of the exciting coil of the magnet Mg2 is compensated with that produced by means of the permanent magnet 20, so that the armature 21 is no more attracted with the magnet Mg2, whereby the armature holding lever 22 is rotated along the counter-clockwise direction by means of the spring 22a in such a manner that together with the armature holding lever 22 the signal start lever 23 is rotated so as to rotate the release lever 19. Along with the operation of the release lever 19 the holding claw 9 is rotated along the counterclockwise direction so as to release the holding of the automatic diaphragm driving energy storing lever 5 which is rotated along the clockwise direction by means of the spring 5a. Along with the rotation of the automatic diaphragm driving energy storing lever 5 the automatic aperture setting lever 4 is rotated along the clockwise direction through the common lever 8, whereby the pin 74 of the diaphragm driving ring at the lens side is rotated along the clockwise direction so as to close the diaphragm blades not shown in the drawing. Further, the automatic diaphragm driving energy storing lever 5 is rotated along the direction along which the end of the lever 5 leaves the lower part of the mirror driving lever 31, which is, therefore, rotated along the counterclockwise direction by means of the spring 31a. The mirror raising lever 32 arranged coaxially with the mirror driving lever 31a is rotated along the same direction as that along which the raising up holding claw 33 is rotated so as to rotate the raising up middle lever 34 along the counterclockwise direction, by means of which lever 34, the mirror receiving plate 35 is raised upwards around the shaft 38b through the pin of the mirror receiving plate 35. Further, along with the rotation of the mirror driving lever 31 the leading shutter curtain holding lever 36 is rotated along the clockwise direction by means of the projection 31c, whereby the hook part at the other end leaves the rising up part of the leading shutter curtain release lever 37, which rotates the leading shutter curtain tension lever 38 through the spring 37a so as to open the count switch SW4, whereby at the same time the leading shutter curtain of the shutter mechanism not shown in the drawing is started by means of the leading shutter curtain gear 39 and the pinion 41.

On the other hand the high level output at the output terminal ST5 of the decoder DE1 is delivered to the NAND gate N8 so that when the count switch SW4 is opened the output of the comparator CP1 becomes low in level and delivered to the NAND gate N28, while the output of the NAND gate N23 becomes high in level and is delivered to the NAND gate N8. Consequently, the output of the NAND gate N8 becomes low in level, while the output of the NAND gate N19 becomes high in level and is delivered to the input terminal K of the Flip-Flop F1 and also to the input terminal J of the Flip-Flop F4 through the NOR gate NR4 and the inverter I3. The output at the output terminal Q of the Flip-Flop F1 becomes low in level in synchronization with the rising up of the pulse inverted by means of the inverter I6, while the output at the output terminal Q of the Flip-Flop F4 becomes high in level. By means of the high level output of the Flip-Flop F4 the outputs of the decoder DE1 become all low in level. However, the output at the output terminal Q of the Flip-Flop F4 is kept at high level, while the output at the output terminal Q of the Flip-Flop F3 is kept at the high level. In consequence, the counter C2 is reset. At the same time, when the output at the output terminal of the Flip-Flop F7 becomes high in level in accordance with the rising up of the next pulse inverted by means of the inverter I6, the output at the output terminal Q of the Flip-Flop F4 becomes low in level. Thus, the counter C2 which has been reset is released, while the output of the output terminal ST4 of the decoder DE1 becomes high in level. The high level output from the output terminal ST4 of the decoder DE1 is delivered to the NAND gates N14 and N49. Thus, the NAND gate N49 is ready to accept the output of the NAND gate N36. Because the flash light switch SW60 is in the opened state, the output of the comparator CP3 is high in level and is delivered to the NAND gate N53, the AND gates A7–A10, the NAND gate N54 and the AND gate A11. Now, let us suppose that the outputs at the output terminals Q1–Q3, Q4–Q5 of the registers G1 and G2 are low in level, namely "0". To all of the input terminals A, B, C and D of the decoder DE2, a low level signal is delivered so that the output at the output terminal Q0 of the decoder DE2 is high in level. Thus, the output pulse with 8192 Hz of the counter C1 is delivered to the counter C4 through the NAND gates N37, N36, N49 and N51, whereby the counter C4 counts the pulse with 8192 Hz. The low level signals from the output terminals Q1, Q2 and Q3 of the register G1 are respectively delivered to the NAND gate N52 and the exclusive OR gates E2 and E3 through the NAND gate N55 and the AND gates A7 and A8, while the output of the NAND gate N52 is delivered to the exclusive OR gate E1. Thus, at the time point at which the counter C4 has counted 8 pulses with 8192 Hz, a high level output is delivered from the output terminal Q4, consequently, the output of the NOR gate NR7 becomes high in level and is delivered to the NOR gate NOR8, whereby the output of the NOR gate NR9 which constitutes a Flip-Flop circuit together with the NOR gate NR8 becomes high in level. Consequently, at the time point at which the output at the output terminal ST4 of the decoder DE1 has become high in the level, namely after the lapse of 1/1024 sec. after 8 pulses with 8192 Hz have been counted after the count switch SW4 has been opened, the NOR gate NR9 delivers a high level output. Further, when the outputs at the output terminals Q1 of the registers G1 and G2 are high in level, namely "1", while the outputs at the other outputs Q2, Q3, Q4–Q6 are all low in level, namely "0", the levels of the outputs at the output terminals Q1 and Q4 become high in level at the time point at which the counter C4 has counted 9 pulses with 8192 Hz. Thus, the output of the NOR gate NR7 becomes high in level and the output of the NOR gate NR9 becomes high in level. Consequently, after about ⅛ step time after the lapse of 1/1024 sec. the NOR gate NR9 delivers a high level signal. Namely the shutter time is controlled with the accuracy of ⅛ step. The high level output of the NOR gate NR9 is inverted by means of the inverter I21 and delivered to the operational amplifier OP7 so as to bring the operational amplifier OP7 into the non-operative state. Thus, the transistor TR4 is brought into the switched off state so as to interrupt the current supply to the shutter control magnet Mg3. Hereby, the armature 45 is no more attracted with the magnet Mg2, the lever 44 to be attracted is rotated along the clockwise direction by means of the spring 44a in such a manner that the tail shutter curtain gear 42 is disengaged from the pin 42a. Thus, the tail shutter curtain gear 42 is rotated so that the tail shutter curtain not shown in the drawing starts to run whereby the lever 46 is rotated along the clockwise direction by means of the pin 42b. Along this rotation, the signal lever 47 is rotated along the counterclockwise direction, the mirror return signal lever 48 rotated along the clockwise direction and the mirror raising holding claw 33 is rotated along the counterclockwise direction by means of the pin 48a so as to be disengaged from the lever 32 in such a manner that the raised state of the mirror receiving plate 35 is released, whereby the mirror is returned into the lowered position by means of a spring not shown in the drawing. Further, by means of the lower end of the mirror return signal lever 48 the automatic diaphragm return signal lever 10 is rotated along the counterclockwise direction so as to rotate the pin 8a of the common lever along the counterclockwise direction and release the holding of the falling down part 4b of the automatic aperture setting lever 4. The automatic aperture setting lever 4 is rotated along the clockwise direction by means of the return spring 4a, whereby the pin 74 of the diaphragm driving ring at the side of the lens follows the rotation of the automatic aperture setting lever 4 by means of a spring not shown in the drawing, so that the diaphragm blades are opened and the photographing is terminated.

On the other hand, the high level signal of the NOR gate NR7 is delivered to the NAND gate N14, whose output becomes low in level. Thus, the output of the NAND gate N18 becomes high in level and is delivered to the input terminal J of the Flip-Flop F2 and further to the input terminal J of the Flip-Flop F4 through the NOR gate NR4 and the inverter I3. Thus, the outputs at the output terminals Q of the Flip-Flops F2 and F4 become high in level in synchronization with the rising of the pulse inverted by means of the inverter I6 and the output at the output terminal Q becomes low in level. Thus, the counter C2 is reset and at the same time the outputs of the decoder DE1 become all low in level, the output of the NAND gate N10 high in level and the levels at the input terminals J and K of the Flip-Flops F1–F3 become all low. However, the levels at the output terminals Q of the Flip-Flops F2 and F4 are kept high, while the level at the output terminal Q of the Flip-Flop F3 is kept also high. Consequently, at the same time when the levels at the output terminals Q of the Flip-Flops F5 and F7 become high in level in accordance with the rising up of the next pulse inverted by means of the inverter I6, the output at the output terminal of the Flip-Flop F4 becomes low in level. Consequently, the counter C2 which has been reset is released, while the output at the output terminal ST6 of the decoder DE1 becomes high in level and is delivered to the NAND gate N15. To this NAND gate N15 the output with 16 Hz of the counter is delivered and the output of the NAND gate N15 becomes low in level after the lapse of 30 ms after the high level output of the output terminal ST6 of the decoder DE1 has been delivered. This 30 ms is intended to be the time during which the mechanical operations such as the mirror return, the diaphragm return and so on are to be completed. The low level output of the NAND gate N15 is delivered to the NAND gates N19 and N20 so as to bring the outputs of the NAND gates N19 and N20 at the high level, whereby the high level outputs of the NAND gates N19 and N20 are delivered to the input terminals K of the Flip-Flops F2 and F3 and also to the input terminal J of the Flip-Flop F4 through the NOR gate NR4 and the inverter I4. Thus, the outputs at the output terminals Q of the Flip-Flops F2 and F3 become low in level in synchronization of the rising up of the pulse inverted by means of the inverter I6, while the output of the Flip-Flop F4 becomes high in level. Consequently, the outputs of the decoder DE1 become all low in level, the output of the NAND gate N15 high in level and the levels at the input terminals J and K of the Flip-Flops F1–F3 become low. At the same time the counters C1 and C3 are reset. Then, the outputs at the output terminals Q of the Flip-Flops F4, F6 and F7 become low in accordance with the rising up of the pulse inverted by means of the inverter I6. Thus, the counters which have been reset are released, whereby the output at the output terminal ST0 of the decoder DE1 becomes high in level. Because at this time, the outputs at the output terminals Q of the Flip-Flops F6 and F7 become high in level, the output of the NAND gate N33 becomes low in level so as to bring the transistor TR10 in the switched off state. When at this time the release button 58 is not pushed the switch SW1 is in the opened state so that the voltage Vcc exists no more and the camera operation is terminated. Hereby, even if the release button 58 is in the pushed state and the switch SW2 is in the closed state, the AND gate A2 does not operate so that the release operation is not carried out. The transistor TR10 is in the switched off state when the output either at the output terminal ST0 or at the output terminal ST1 of the decoder DE1 is high in the level, while because otherwise one or both outputs at the output terminals $\overline{Q}$ of the Flip-Flops F6 and F7 are low in level the output of the NAND gate N23 is high in level, so that the transistor TR10 is in the switched on state and the voltage is self hold.

Below, the case with the bulb photography will be explained.

When at first the mode change over dial 59 is rotated so as to set the mark B on the dial at the index 60, only the contact of the brush 64a with the conductor pattern 63a is established. Thus, the bulb switch SW12 is closed, while the self timer switch SW7 and the flash light switch SW60 remain in the opened state. When at the same time, the aperture setting ring 1 is rotated so as to set the desired aperture value (preferably the smallest aperture value in this case) at the index 2, the aperture preset ring 3 is rotated by means of the spring 3a, following the rotation of the aperture setting ring 1. The rotation of the aperture preset ring 3 is transmitted to the lever 24 through the signal lever 29 so as to set the value corresponding to the set aperture value at the variable resistance 25.

When then the release button 58 is pushed, along with the first stroke of the release button 58 the switch SW1 is closed and the transistor TR9 is brought into the switched on state, whereby the voltage Vcc is produced. Hereby, until the voltage Vcc reaches the lowest guarantee voltage, the initial clearance of the circuit is carried out by means of the power clear up circuit. After the circuit has been cleared up, the output at the output terminal ST0 of the decoder DE1 becomes high in level, in such a manner that for 9.1 ms the light measuring calculation output is charged in the A-D conversion circuit and after the lapse of 9.1 ms the level of the A-D converted charge is discharged with a constant current. As the result, the output of the comparator CP5 becomes again high in the level. After the above A-D conversion operation has been repeated four times, along with the second stroke of the release button 58 the switch SW2 is closed, when the start signal is produced and the output at the output terminal ST3 of the decoder DE1 becomes high in level. After the lapse of 5 ms, whether the voltage Vcc is higher than the lowest guarantee voltage for the camera control or not and whether a current is running through the shutter control magnet Mg3 in a normal way is judged in such a manner that in case there exists an irregularity the output at the output terminal ST0 of the decoder DE1 is made high in level and the production of the start signal is prohibited, while in case there is no irregularity the output at the output terminal ST7 of the decoder DE1 is made high in level. Thus, the current is supplied to the release magnet Mg2 for 5 ms and actuate the internal mechanism in the camera. After the lapse of this 5 ms the output at the output terminal ST5 of the decoder DE1 becomes high in level. Along with the actuation of the internal mechanism in the camera the leading shutter curtain is opened and the count switch SW4 is opened. The operations mentioned above are carried out quite in the same way as in case of the automatic exposure photography. The high level output at the output terminal ST5 of the decoder DE1 is delivered to the NAND gate N6 beside the NAND gate N3. Thus, the count switch SW12 is in the closed state so that the output of the comparator CP1 is kept high in level while the output of the NAND gate N28 remains low in level. Thus, even when the count switch SW4 is opened, the output of the NAND gate N8 never becomes low in level. Because the output pulse with 4 Hz is delivered to the NAND gate N6 from the counter C2, the output of the NAND gate N6 becomes low in level after the lapse of 125 ms after the output at the output terminal ST5 of the decoder DE1 has become high in level. The low level output of the NAND gate N6 is delivered to the NAND gates N17 and N20 so as to make the level of the outputs of the NAND gates N17 and N20 high. The high level outputs of the NAND gates N17 and N20 are delivered to the input terminals K of the Flip-Flops F1 and F3 and also to the input terminal J of the Flip-Flop F4 through the NOR gate NR4 and the inverter I3. Thus, the synchronization with the rising up of the pulse inverted by means of the inverter I6 the outputs at the output terminals Q of the Flip-Flops F1 and F5 become low in level and the output at the output terminal Q of the Flip-Flop F4 becomes high in level. By means of the high level output from the output terminal Q of the Flip-Flop F4 the outputs of the decoder DE1 become all low in level. However, the output of the output terminal Q of the Flip-Flop F4 is kept high in level. In accordance with the rising up of the next pulse inverted by means of the inverter I6 the outputs at the output terminals Q of the Flip-Flops F5 and F7 become low in level and at the same time the output at the output terminal Q of the Flip-Flop F4 becomes low in level. Consequently, the output at the output terminal ST0 of the decoder DE1 becomes high in level. At this time, the output of the NAND gate N33 becomes low in level, whereby the transistor TR10 is brought in the switched off state and the self-holding of the voltage Vcc is released. Hereby the mode is in the bulb photography mode, so that the release button 58 remains in the pushed state and the switch SW1 remains in the closed state and therefore the voltage Vcc is being produced. Even if the switch SW2 is in the closed state, the release is prohibited because the AND gate A2 does not operate. Further, the counter C4 does not count the pulses, whereby the output of the NOR gate NR7 is low in level. Consequently, the output of the NOR gate NR9 is kept low in level so as to operate the operational amplifier OP7. Thus, the transistor TR4 is in the switched on state, while the current is being supplied to the shutter control magnet Mg2. When the pushing of the release button 58 is released after the lapse of a certain determined time the switch SW1 is opened so as to prohibit the production of the voltage Vcc. Thus, the shutter control magnet Mg3 does not attract the armature any more and in the same way as in case of the automatic exposure photography the tail shutter curtain starts to run, while the mirror driving mechanism and the diaphragm driving mechanism assume the initial positions.

Below, the case with the self timer automatic exposure photography will be explained. When at first the mark SELFA on the mode change over dial 59 is set at the index 60, only the contact of the brush 64a with the conductor pattern 63b is established. Thus, the self timer switch SW7 is closed, while the bulb switch SW12 and the flash light switch SW60 are opened. When then the aperture setting ring 1 is rotated so as to set the desired aperture value on the ring 1 at the index 2, the aperture preset ring 3 is rotated by means of the spring 3a following the rotation of the aperture setting ring 1. The rotation of the aperture preset ring 3 is transmitted to the lever 24 through the signal lever 29 so as to set the value corresponding to the set aperture value at the variable resistance 25.

When then the release button 58 is pushed, along with the first stroke of the release button 58 the switch SW1 is closed so as to bring the transistor TR9 in the switched on state, whereby the voltage Vcc is produced. Hereby, the initial clearance of the circuit is carried out by means of the power clear up circuit until the voltage Vcc reaches the lowest guarantee voltage. After the release of the clearance the output at the output terminal ST0 of the decoder DE1 becomes high in level in such a manner that the light measurement calculation output is charged by means of the A-D conversion circuit for 9.1 ms. After the lapse of 9.1 ms the level at the output terminal ST1 of the decoder DE1 is made high and the charge level of the A-D conversion is discharged with a constant current. As the result the level of the output of the comparator CP5 is inverted high, while the output of the output terminal ST0 of the decoder DE1 becomes high in level again. When the switch SW2 is closed along with the second stroke of the release button 58 after the above mentioned A-D conversion operation has been repeated four times, the output of the Flip-Flop F8 becomes high in level. The above mentioned operation after the switch SW1 has been closed is carried out quite in the same way as in case of the automatic exposure photography. The high level output of the Flip-Flop F8 is delivered to the NAND gates N3 and N10 beside the NAND gates N7 and N9. Because the self timer switch SW7 is in the closed state, the low level signal corresponding to the closing of the switch SW7 is delivered to the NAND gates N3 and N10 through the inverters I24 and I2 so that the output of the NAND gates N3 and N10 never become low in level. However, the low level signal in accordance with the closing of the self timer switch SW7 is inverted by means of the inverter I24 and delivered to the NAND gates N7 and N9. To the NAND gate N9 the output from the output terminal of the decoder DE1 is delivered, while to the NAND gate N7 the output from the output terminal ST1 of the decoder DE1 is delivered. Consequently, when the output of the Flip-Flop F8 becomes high in level in case the output at the output terminal ST0 of the decoder DE1 is high in level the output of the NAND gate N9 becomes low in level, while when the output of the Flip-Flop F8 becomes high in level in case the output at the output terminal ST1 of the decoder DE1 is high in level the output of the NAND gate N7 becomes low in level. When the output of the NAND gate N9 becomes low in level, the output of the NAND gate N18 is made high in level and is delivered to the input terminal J of the Flip-Flop F2 and further to the input terminal J of the Flip-Flop F4 through the NOR gate NR4 and the inverter I3. Thus, the outputs at the output terminals Q of the Flip-Flops F2 and F4 become high in synchronization with the rising up of the pulse inverted by means of the inverter I6, while the outputs at the output terminals Q become low in level. Thus, the counters C2 and C3 are reset, while at the same time the outputs of the decoder DE1 become all low in level, whereby the output of the NAND gate N9 becomes high in level, while the levels at the input terminals J and K of the Flip-Flops F1 and F2 become all low. However, the levels at the output terminals Q of the Flip-Flops F2 and F4 are kept high, while in accordance with the rising up of the next pulse inverted by means of the inverter I6 the level at the output terminal Q of the Flip-Flop F6, while at the same time the output at the output terminal Q of the Flip-Flop F4 becomes low in level. Thus, the counters C2 and C3 which have been reset are released, while the level at the output terminal ST2 of the decoder DE1 becomes high in level. Further, when the output of the NAND gate N7 becomes low in level, the outputs of the NAND gates N17 and N18 are made high, whereby the high level output of the NAND gate N18 is delivered to the input terminal J of the Flip-Flop F2, while the high level output of the NAND gate N17 is delivered to the input terminal K of the Flip-Flop F1. The high level outputs of the NAND gates N17 and N18 are delivered to the input terminal J of the Flip-Flop F4 through the inverter I3. Thus, in synchronization with the rising up of the pulse inverted by means of the inverter I6 the outputs at the output terminals Q of the Flip-Flops F2 and F4 become high in level, while the output at the output terminal Q of the Flip-Flop F1 becomes low in level. Thus, the counters C2 and C4 are reset, while at the same time the outputs of the decoder DE1 become low in level and the output of the NAND gate N7 becomes high in level in such a manner that the levels at the input terminals J and K of the Flip-Flops F1-F3 become all low in level. However, the level at the output terminals Q of the Flip-Flops F2 and F4 are kept high so that in accordance with the rising up of the next pulse inverted by means of the inverter I6 the level at the output terminal Q of the Flip-Flop F6 becomes high in level, while at the same time the output at the output terminal Q of the Flip-Flop F4 becomes low in level. Thus, the counters C2 and C3 which have been reset are released, while at the same time the output at the output terminal ST2 of the decoder DE1 becomes high in level. When the output of the Flip-Flop F3 is high in level in case in this way the level either at the output terminal ST0 or at the output terminal ST1 of the decoder DE1 is high in level, the output at the output terminal ST2 of the decoder DE1 becomes high in level accordingly.

The high level output at the output terminal ST2 of the decoder DE1 is delivered to the NAND gates N2 and N11, whereby when the voltage Vcc is lower than the lowest guarantee voltage for controlling the camera the output of the comparator CP2 becomes low in level and delivered to the NAND gate N31, whose high level output is delivered to the NAND gate N11, whereby the output of the NAND gate N11 becomes low in level. The low level output of the NAND gate N11 is delivered to the NAND gate N21 so that the output of the NAND gate N22 which constitutes a Flip-Flop circuit together with the NAND gate N22 becomes low in level, whereby the AND gate A2 does not operate. Further, when the output of the NAND gate N11 becomes low the high level output of the NAND gate N19 is delivered to the input terminal K of the Flip-Flop F2 and further to the input terminal J of the Flip-Flop F4 through the inverter I3. In synchronization with the rising up of the pulse inverted by means of the inverter I6, the output at the output terminal Q of the Flip-Flop F2 becomes low in level, while the output terminal Q of the Flip-Flop F4 becomes high in level. By means of this high level output at the output terminal Q of the Flip-Flop F4 the outputs of the decoder DE1 become all low in level. However, the level at the output terminal Q of the Flip-Flop F2 is kept low, while the level at the output terminal Q of the Flip-Flop F4 is kept high. In accordance with the rising up of the next pulse inverted by means of the inverter I6 the level at the output terminal Q of the Flip-Flop F6, while at the same time the output at the output terminal Q of the Flip-Flop F4 becomes low in level. Thus, the level at the output terminal ST0 of the decoder DE1 becomes high in level, whereby the output of the NAND gate N22 is low in level, so that the output of the AND gate A2 does not become high in level. Thus, even if the switch SW2 is closed, the next operation does not start so as to prohibit the release operation of camera. Further, when the voltage Vcc is higher than the lowest guarantee voltage for controlling the camera, the output of the comparator CP2 becomes high in level and the output of the NAND gate N11 never becomes low in level. However, to the NAND gate N2 the output of the AND gate A6 is delivered so that by means of the high level output of the AND gate A6 the output of the NAND gate N2 becomes low in level. Hereby, the output of the AND gate A6 becomes high in level only after the lapse of 10 sec. after the output at the output terminal ST2 of the decoder DE1 has become high in level. Namely, because the high level output at the output terminal ST2 of the decoder DE1 is inverted by means of the inverter I9 and delivered to the NAND gate N37, the output pulse with 8192 Hz of the counter C1 is prohibited to be delivered to the counter C3 through the NAND gate N57. Because the high level output from the output terminal ST2 of the decoder DE1 is delivered to the NAND gate N35, the output with 4 Hz of the counter C2 is delivered to the counter C3 through the NAND gates N35 and N58. Consequently, when the counter C3 has counted 40 pulses with 4 Hz, the output of the AND gate A6 becomes high in level. In the meantime, the high level output from the output terminal ST2 of the decoder DE1 is inverted by means of the inverter I7 and delivered to the NOR gates NR5 and NR6 and the NOR gate NR5 delivers the pulses corresponding to the combination of 2 Hz and 4 Hz of the counter C2 until the level at the output terminal Q6 of the counter C3 becomes high, whereby the pulses are delivered to the transistor TR6 through the OR gate OR3. Thus, the transistor TR6 is repeatedly brought in the switched on and the switched off state so as to flicker the light emitting diode LED2. When the level at the output terminal Q6 of the counter C3 has become high in level, the pulses corresponding of 8 Hz and 16 Hz of the counter C2 are delivered from the NOR gate NR6 and delivered to the transistor TR6 through the OR gate OR3. Thus, the transistor TR6 is repeatedly brought in the switched on and the switched off state so as to flicker the light emitting diode LED2. As explained above, when the output of the AND gate A6 has become high in level, the output of the NAND gate N2 becomes low in level, whereby the output of the NAND gate N16 becomes high in level. This high level output of the NAND gate N16 is delivered to the input terminal J of the Flip-Flop F1 and also to the input terminal J of the Flip-Flop F4 through the NOR gate NR4 and the inverter I4. Thus, in synchronization with the rising up of the pulse inverted by means of the inverter I6 the outputs at the output terminals Q of the Flip-Flops F1 and F4 become high in level. Thus, the outputs of the decoder DE1 become all low in level, the output of the NAND gate N1 becomes high in level and the levels at the input terminals J and K of the Flip-Flops F1-F3 become low. However, the levels at the output terminals Q of the Flip-Flops F1 and F4 are kept high, while the level at the output terminal Q of the Flip-Flop F2 is kept high. By means of the high level output at the output terminal Q of the Flip-Flop F4 the counters C1 and C3 are reset. Then, in accordance with the rising up of the next pulse inverted by means of the inverter I6 the output at the output terminal Q of the Flip-Flop F5 becomes high in level, while at the same time the output at the output terminal Q of the Flip-Flop F4 becomes low. Thus, at the same time when the level at the output terminal ST3 of the decoder DE1 becomes high, the counters C1 and C3 which have been reset are released. Thus, after the output at the output terminal ST2 of the decoder DE1 is kept high in level for 10 sec. the level at the output terminal ST3 of the decoder DE1 becomes high in level, whereby the LED2 flickers with 2 Hz ¼ duty for 8 sec. and then with 8 Hz ¼ duty for the next 2 sec. The operation after the level at the output terminal ST3 of the decoder DE1 has become high is carried out quite in the same way as in case of the automatic exposure photography.

Below, the case with the flash light photography will be explained. At first, the case the universal speed light device is mounted on the accessory shoe 56 will be explained.

When at first the mode change over dial 59 is rotated so as to set the mark on the dial 59 at the index 60, only the contact of the brush 64b with the conductor pattern 63c is established. Thus, the flash light switch SW60 is closed, while the self timer switch SW7 and the bulb switch SW12 remain in the opened state. When further the aperture setting ring 1 is rotated so as to set the determined aperture value on the aperture setting ring 1 (the appointed aperture value in case of the light adjusting speed light device, while the aperture value corresponding to the guide number and the object distance in case of the normal speed light device) at the index, the aperture preset ring 3 is rotated by means of the spring 3a, following the rotation of the aperture preset ring 1. The rotation of this aperture preset ring 3 is transmitted to the lever 24 through the signal lever 29 so as to set a value corresponding to the set aperture value at the variable resistance. When then the release button 58 is pushed, along with the first stroke of the release button 58 the switch SW1 is closed, whereby the transistor TR9 is brought in the switched on state, while the voltage Vcc is produced. The initial clearance of the circuit is carried out by means of the power clear up circuit until the voltage Vcc reaches the lowest guarantee voltage in the same way as in case of the automatic exposure photography. After the circuit has been cleared, the output at the output terminal ST0 of the decoder DE1 becomes high in level and delivered to the operational amplifier OP3UK so as to operate the operational amplifier OP3K, to the NAND gate N1 and further to the NAND gate N34 through the OR gate OR1. Because the switch SW60 is closed, the output of the comparator CP3 is low in level so as to bring the operational amplifier OP1AE in the non-operative state, bringing the operational amplifier OP1AE in the operative state. Further the low level output of the comparator CP3 is delivered to the NAND gate N34, whose output is made high in level and kept so. Thus, the low level output of the comparator CP3 is maintained. The operational amplifier OP1AE produces a voltage for example corresponding to the shutter time of 1/60 sec., which voltage is delivered to the operational amplifier OP3K, while the shutter time of 1/60 sec. is displayed in the meter 57. By means of the output of the operational amplifier OP3K, the condenser C1 is charged, while the output voltage of the operational amplifier OP4 becomes higher than the voltage Vcc. Then, the condenser C1 is charged for 9.1 ms after the output at the output terminal ST0 of the decoder DE1 has become high in level. The operation after this is carried out in the same way as in case of the above mentioned automatic exposure photography. After the lapse of 9.1 ms, the level at the output terminal ST1 of the decoder DE1 is made high and the charge level of the A-D conversion is discharged with a constant current. As the result the output of the comparator CP5 is inverted high in level and the output of the output terminal ST0 of the decoder DE1 becomes again high in level. When after the A-D conversion operation has been repeated four times, along with the second stroke of the release button 58 the switch SW2 is closed, the output of the Flip-Flop F8 becomes high in level so as to produce the start signal, while the output at the output at terminal ST3 of the decoder DE1 becomes high in level so as to supply current to the shutter control magnet Mg3. Further, after the lapse of 5 ms, whether the voltage Vcc is higher than the lowest guarantee voltage for controlling the camera or not, or whether the current runs through the shutter control magnet Mg2 in a normal way or not is judged in such a manner that when there exists an irregularity the output at the output terminal ST0 of the decoder DE1 is made high in level so as to prohibit the production of the start signal, while there exists no irregularity the output at the output terminal ST7 of the decoder DE1 is made high in level. In this way, the release magnet Mg2 is excited for 5 ms so as to actuate the internal mechanism in the camera. After the lapse of this 5 ms, the output at the output terminal ST5 of the decoder DE1 is made high in level. Along with the actuation of the internal mechanism of the camera, the leading shutter curtain is opened, while the count switch SW4 is opened. Thus, the output at the output terminal ST4 of the decoder DE1 becomes high in level. The operation until now is carried out in the same way as in case of the automatic exposure photography. When the synchronization switch SWX is closed after the leading shutter curtain has run, the speed light device emits the flash light. The high level output from the output terminal ST4 of the decoder DE1 is delivered to the NAND gates N14 and N44 so that the NAND gate N49 is ready to accept the output of the NAND gate N36. The flash light switch SW60 is in the closed state, while the output of the comparator CP3 is low in level, so that the outputs of the AND gates A7-A11 are all low in level, while the outputs of the NAND gates N53 and N54 are all high in level. Thus, the inputs at the input terminals A, B and C of the decoder DE2 are 0, 0, 1, 0, while the level at the output terminal Q4 of the decoder DE2 is high. The pulses with 512 Hz of the counter C1 are delivered through the NAND gates N41, N36, N49 and N51 to the counter C4, which counts the pulses. At this time, a high level signal is delivered to the exclusive OR gate E1 while a low level signal is delivered to the exclusive OR gate E2, so that at the time point at which 9 pulses with 512 Hz have been counted, the counter C4 delivers a high level output from the output terminal Q4. Thus, the output of the NOR gate NR7 is made high in level and delivered to the NOR gate NR8, whereby the output of the NOR gate NR8 which constitutes a Flip-Flop circuit together with the NOR gate NR8 becomes high in level. Consequently, at the time point at which the output at the output terminal ST4 of the decoder DE1 becomes high in level, namely after the lapse of 9/512 sec. during which 9 pulses with 512 Hz is counted after the count switch SW4 has been opened, the NOR gate NR9 delivers a high level output. After this, in the same way as in case of the automatic exposure photography the current supply to the shutter control magnet Mg3 is interrupted, the tail shutter curtain starts to run and the mirror and the diaphragm driving mechanism assume the initial position, while at the same time the output at the output terminal ST8 of the decoder DE1 becomes high in level and after the lapse of 30 ms the output at the output terminal ST0 of the decoder DE1 becomes high in level.

In the above mentioned case, a universal speed light device is mounted on the accessory shoe 56. In case instead of mounting the speed light device, ⚡ mark is set at the index 60, the synchronization time is controlled with about 1/60 sec.

Below, the case on the accessory shoe 56 an exclusive speed light device shown in FIG. 3 is mounted on the accessory shoe 56 so as to carry out the flash light photography by means of the exclusive speed light device will be explained. When exclusive speed light device is mounted on the accessory shoe 56, the terminals TC', TX' and TA' at the side of the speed light device are respectively connected to the terminals at the side of camera. In case the automatic exposure photography is carried out in the above mentioned state, the power source switch 90 is connected to the contact 90a, in operative engagement with which the switch 91 is connected to the contact 91a and the mark A on the mode change over dial 59 is set at the index 60. Hereby, the photography in the above mentioned automatic exposure mode is carried out.

In case the flash light photography is carried out, the power source switch 90 is connected to the contact 90b, in operative engagement with which the switch 91 is connected to the contact 91a and the mark A on the mode change over dial 59 is set at the index 60. Then the flash light photography is carried out in accordance with the time when the speed light device has been charged, while in case the flash light photography is not carried out, the automatic exposure photography under the day light is carried out.

Namely, when on the accessory shoe 56 of the camera the exclusive speed light device is mounted and the power switch 90 is connected to the contact 90a, in operative engagement with which the switch 91 is connected to the contact 91a, the power source voltage of the battery 75 is raised by means of the step up circuit 76 and charge the condenser 77. When at the same time, the mode change over dial 59 is rotated so as to set the mark A on the dial 59 for the automatic exposure at the index 60, the brushes 64a and 64b are not brought into contact with the conductor patterns 63a, 63b and 63c, whereby the bulb switch SW12, the self timer switch SW7 and the flash light switch SW60 are brought into the opened state. When then the aperture set ring 1 is rotated so as to set the determined aperture value on the ring 1 (the appointed aperture value, for example 5.6 for the then exclusive speed light device) at the index 2, the aperture preset ring 3 is rotated by means of the spring 3a, following the rotation of the aperture setting ring 1. The rotation of the aperture preset ring 3 is transmitted to the lever 24 through the signal lever 29 in such a manner that a value corresponding to the determined aperture value is set on the variable resistance 25.

When then the release button 58 is pushed, along with the first stroke of the release button 58 the switch SW1 is closed and the transistor TR9 is brought into the switched on state so as to produce the voltage Vcc. The initial clearance of the circuit is carried out by means of the power up clear circuit until the voltage Vcc reaches the lowest guarantee voltage. After the circuit is cleared, the output at the output terminal ST0 of the decoder DE1 becomes high in level, whereby the light measurement calculation output is charged for 9.1 ms by means of the A-D conversion circuit and after the lapse of 9.1 ms the level at the output terminal ST1 of the decoder DE1 is made high and the charge level of the A-D conversion is discharged with a constant current. As the result, the output of the comparator CP5 is inverted high, while the output at the output terminal ST0 of the decoder DE1 becomes again high in level. When along with the second stroke of the release button 58 the switch SW2 is closed after the above mentioned A-D conversion operation is repeated at least four times, the start signal is produced, whereby the output at the output terminal ST3 of the decoder DE1 becomes high in level. When the main condenser 77 at the side of the speed light device has been charged sufficiently for carrying out the flash light photography while the A-D conversion is being repeated, the detecting circuit 78 detects the fact so as to light the neon tube in the display circuit 79 and display that the charge has been completed, while a current is supplied to the base of the transistor 88 so as to bring the transistor 88 in the switched on state. Thus, the level at the terminal TC', namely the terminal TC becomes low. When the level at the output terminal TC becomes low while the output of the NAND gate N35 is low in level, the comparator CP3 is in the non-operative state, so that when the output of the NAND gate N35 is inverted high in level the output of the comparator CP3 becomes low in level. After then, the output of the NAND gate N34 is kept high in level, while the output of the comparator CP3 is kept low in level. Even if the main condenser 77 has been sufficiently charged while the output of the NAND gate N35 is high in level, the transistor TR3 is in the switched off state so that the output voltage KVC of the operational amplifier OP3 is applied to the base of the transistor 82 through the resistance R20, the terminals TC and TC', the switch 91 and the resistances 89 and 93 so as to bring the transistor 82 in the switched on state and short circuit the low voltage side of the neon tube 79a, in such a manner that no voltage is produced at the low voltage side of the neon tube 79a and the transistor 88 is kept in the switched off state. Thus, the output of the comparator CP3 is kept high in level. When then the output of the NAND gate N34 become low in level, the comparator CP3 is brought into the non-operative state, whereby because the transistor TR5 is brought into the switched on state the level at the terminal TC becomes low in level, the transistor 82 is brought into the switched off state and the transistor 88 into the switched on state. The output of the NAND gate N34 becomes high in the level, while the output of the comparator CP3 becomes low in level. After then, the output of the NAND gate N34 is kept high in level, while the output of the comparator CP3 is kept low in level. When the output of the comparator CP3 becomes low in level the operational amplifier OP1AE is brought into the non-operative state, while the operational amplifier OP1EF is brought into the operative state so that the meter 57 displays the shutter time of 1/60 sec. When then the output at the output terminal ST3 of the decoder DE1 becomes high in level, in the same way as in case of the above mentioned automatic exposure photography a current is supplied to the shutter control magnet Mg3. Further, after the lapse of 5 ms whether the voltage Vcc is higher than the lowest guarantee voltage for controlling the camera or not or whether the current is supplied to the shutter control magnet Mg2 in a normal way is judged in such a manner that in case there is an irregularity the output at the output terminal ST0 of the decoder DE1 is made high in the level and the production of the start signal is prohibited, while in case there exists no irregularity the output at the output terminal ST7 of the decoder DE1 is made high in level. Thus, the current is supplied to the release magnet Mg2 for 5 ms so as to actuate the internal mechanism in the camera. After the lapse of this 5 ms the output at the output terminal ST5 of the decoder DE1 becomes high in level. Along with the actuation of the internal actuation of the internal mechanism in the camera the leading shutter curtain is opened and the count switch SW4 is opened. When the synchronization switch SW4 is closed after the leading shutter curtain has run the base current of the transistor 81a comes from the display circuit 79 through the resistance 83 so as to bring the transistor 81c in the switched on state. At this time the condenser 81e has been charged through the resistance 81d in advance, so that when the transistor 81c is brought into the switched on state, the charge stored in the condenser 81e is delivered to the trigger circuit 80 through the transistor 81c, which produces the trigger pulse. Thus, the discharge tube 84 emits the flash light. After then, the light reflected from the object is sensed by means of the light sensing element 86 in such a manner that as soon as the output circuit of the integrating circuit 87 has reached a certain predetermined value the discharge tube 84 is switched off so as to stop the emission of the flash light. On the other hand, the high level output from the output terminal ST4 of the decoder DE1 is being delivered to the NAND gates N14 and N44 so that the NAND gate N49 is ready to accept the output of the NAND gate N36. Because the output of the comparator CP3 is low in level the outputs of the AND gates A7-A11 are all low in level, while the outputs of the NAND gates N53 and N54 are high in level. Thus, the inputs at the input terminals A, B and C of the dicoder DE2 are 0, 0, 1, 0 and the level at the output terminal Q4 of the decoder DE2 becomes high in level. Thus, the pulses with 512 Hz of the counter C1 are delivered through the NAND gates N41, N36, N49 and N51 to the counter C4 which counts the pulses. At this time, a high level signal is delivered to the exclusive OR gate E1 while a low level signal is delivered to the exclusive OR gates E2 and E3, so that at the time point at which the counter C4 has counted 9 pulses with 512 Hz a high level signal is delivered from the output terminal Q4. Thus, the output of the NOR gate NR7 becomes high in level and delivered to the NOR gate NR8, whereby the output of the NOR gate NR9 which constitutes a Flip-Flop circuit together with the NOR gate NR8 becomes high in level. Consequently, at the time point at which the output at the output terminal ST4 of the decoder DE1 has become high in level, namely after the lapse of 9/512 sec. during which 9 pulses with 512 Hz has been counted after the count switch SW4 has been opened, a high level output is delivered from the NOR gate NR9. After then in the same way as in case of the automatic exposure photography the current supply to the shutter control magnet Mg3 is interrupted, the tail shutter curtain starts to run, the mirror driving mechanism and the diaphragm driving mechanism assume the initial positions, while at the same time the output at the output terminal ST6 of the decoder DE1 becomes high and after the lapse of 30 ms the output at the output terminal ST0 of the decoder DE1 becomes high in level.

Further, when the output at the output terminal ST3 of the decoder DE1 becomes high in level because the switch SW2 is closed in the state in which the speed light device has not yet been charged while the A-D conversion operation is being repeated, the output of the NAND gate N34 becomes high in level, whereby because the transistor TR5 is in the switched off state the output voltage KVC of the operational amplifier OP5 is applied to the base of the transistor 82 through the resistance R29, the terminals TC and TC', the switch 91 and the resistances 89 and 93 so as to bring the transistor 82 in the switched on state and short circuit the low voltage side of the neon tube 79a. Thus, no voltage is produced at the low voltage side of the neon tube 79a, keeping the transistor 88 in the switched off state. Thus, the output of the comparator CP3 is kept high in level. Then, the level at the output terminal ST3 of the decoder DE1 becomes high and a current is supplied to the shutter control magnet Mg3. Further, after the lapse of 5 ms whether the voltage Vcc is higher than the lowest operation guarantee voltage for controlling the camera or not, or whether the current is supplied to the shutter control magnet Mg3 in a normal way or not is judged, whereby in case there exists an irregularity the output at the output terminal ST0 of the decoder DE1 is made high in level and the production of the start signal is prohibited, while in case there exists no irregularity the output at the output terminal ST7 of the decoder DE1 is made high. In this way, the current is supplied to the release magnet Mg2 for 5 ms so as to actuate the internal mechanism in the camera. After the lapse of this 5 ms the output at the output terminal ST3 of the decoder DE1 is made high. Along with the actuation of the internal mechanism of the camera the leading shutter curtain is opened and the count switch SW4 is opened. Thus, the output at the output terminal ST4 of the decoder DE1 is made high. When the leading shutter curtain has run the synchronization switch SWx is closed, whereby because the transistor 82 is in the switched on state the transistor 81a is not brought in the switched on state, while the discharge tube 84 does not emit the flash light. Further, because the output at the output terminal ST4 of the decoder DE1 becomes high in level, the A-D conversion value is memorized longer, and the current supply to the magnet Mg2 is interrupted after the lapse of this prolonged time. Then, the tail shutter curtain starts to run, the current supply to the magnet Mg3 is released and the output at the output terminal ST6 of the decoder DE1 becomes high in level and after the lapse of 30 ms the output at the output terminal ST0 of the decoder DE1 is made high. As long as the release button 58 is being pushed after the output at the output terminal ST0 of the decoder DE1 has become high in level, the level at the output terminal ST1 of the decoder DE1 becomes high in level. After then, as mentioned above, the level at the output terminal ST0 of the decoder DE1 becomes high in level and this operation is repeated. When the charge has been completed in case the level at the output terminal ST0 of the decoder has become high in level after the level at the output terminal ST6 of the decoder DE1 has become high in level, the output of the comparator CP3 becomes low in level, while the transistor 88 is brought in the switched on state. Consequently, even if the current supply to the magnet Mg3 is released before the shutter has run in case of the short shutter time, because the level at the output terminal ST0 of the decoder DE1 becomes high in level after the lapse of 30 ms after the release of the current supply to the magnet Mg3, there is no danger that the transistor 88 should be brought in the switched on state before the shutter has run so as to misoperate the flash light device.

Below the case with the flash light photography by means of a self timer will be explained. To begin with, the case a universal speed light device is mounted on the accessory shoe 56 will be explained.

When at first the mode change over dial 59 is rotated so as to set the mark SELF on the dial 59 at the mark 60, the brush 64a is brought in contact with the conductor pattern 63b, while the brush 64b is brought in contact with the conductor pattern 63c. Thus, the flash light switch SW60 is closed, while the self timer switch SW7 is closed, whereby the bulb switch SW12 assumes the opened state. When then the aperture set ring 1 is rotated so as to set the determined value (the appointed value in case of the light adjusting speed light device and an aperture value corresponding to the guide number and the object distance) at the index, the aperture preset ring 3 is rotated by means of the spring 3a, following the rotation of the aperture setting ring 1. The rotation of the aperture preset ring 3 is transmitted to the lever 24 through the signal lever 29 so as to set the value corresponding to the set aperture value at the variable resistance 25. When then the release button 58 is pushed, along with the first stroke of the release button 58 the switch SW1 is closed, whereby the transistor TR9 is brought in the switched on state and the voltage Vcc is produced. The initial clearance of the circuit is carried out by means of the power up clear circuit until the voltage Vcc reaches the lowest operation guarantee voltage. After the clearance of the circuit the output at the output terminal ST0 of the decoder DE1 becomes high in level. The high level output at the output terminal ST0 of the decoder DE1 is supplied to the operational amplifier OP3UK so as to operate the operational amplifier OP3UK. Further, the high level output of the output terminal ST0 of the decoder DE1 is delivered to the NAND gate N1 and also to the NAND gate N34 through the OR gate OR1. Because the flash light switch SW60 is closed, the output of the comparator CP3 becomes low in level so as to bring the operational amplifier OP1AE into the non-operative state, bringing the operational amplifier OP1EF in the operative state. Further, the low level output of the comparator CP3 is delivered to the NAND gate N34, whose output is kept high in level. Thus, the output of the comparator CP3 is kept high in level. The operational amplifier OP1AE delivers the voltage corresponding to the shutter time, for example 1/60 sec. to the meter 57 which displays the shutter time. By means of this output of the operational amplifier OP3UK the condenser C1 is charged and the output voltage of the operational amplifier OP4 becomes higher than the voltage Vcc. The condenser C1 is charged during 9.1 ms after the output at the output terminal ST0 of the decoder DE1 becomes high in level. The operation after then is carried out in the same way as in case of the above mentioned automatic exposure photography. After the lapse of this 9.1 ms the output at the output terminal ST1 of the decoder DE1 becomes high in level, whereby the charge level of the A-D conversion is discharged with a constant current. As the result, the output of the comparator CP5 is inverted high in level, while the output at the output terminal ST0 of the decoder DE1 becomes again high in level. When along with the second stroke of the release button 58 the switch SW2 is closed after the above mentioned A-D conversion operation is repeated four times, the output of the Flip-Flop F8 becomes high in level, whereby the operation from the closing of the switch SW1 the operation is carried out in the same way as in case the mark is set at the index 60. Because at this time the self timer switch SW7 is in the closed state, the output of the NAND gate N9 becomes low in level when the output of the Flip-Flop F8 becomes high in level while the output at the output ST0 of the decoder DE1 is high in level, while the output of the NAND gate N7 becomes low in level when the output of the Flip-Flop F8 becomes high in level while the output at the output terminal ST1 of the decoder DE1 is high in level. However, the output at the output terminal ST2 of the decoder DE1 becomes high in level whether the output of the NAND gate N9 or N7 becomes low in level. Consequently, when the voltage Vcc is lower than the lowest operation voltage for controlling the camera, the AND gate A2 does not operate so as to prohibit the release operation, while the output at the output terminal ST0 of the decoder DE1 becomes high in level. When the voltage Vcc is higher than the lowest guarantee voltage for controlling the camera, after the lapse of 10 sec. after the output at the output terminal ST2 of the decoder DE1 has become high in level the output at the output terminal ST3 of the decoder DE1 becomes high in level. During this 10 sec. the LED2 flickers and more quickly for the last 2 sec. The operation after the closing of the switch SW2 till the level at the output terminal ST0 and ST3 of the decoder DE1 becomes high in level is carried out in the same way as in case the mark SELF on the dial 59 is set at the index 60. The operation after the output at the output terminal ST3 of the decoder DE1 has become high in level is carried out in the same way as in case the mark on the dial 59 is set at the index 60.

In this case on the accessory shoe 56 the universal speed light device is mounted, while in case the mark is set at the index 60 without mounting the speed light device the shutter time is controlled with 1/60 sec. in the self timer photographing mode.

Below, the case on the accessory shoe 56 the exclusive speed light device shown in FIG. 3 is mounted and the flash light photography with the exclusive speed light device is carried out by means of a self timer will be explained.

When on the accessory shoe 56 the exclusive speed light device has been mounted, the terminals TC', TX' and TA' at the side of the speed light device are respectively connected to the terminals TC, TX and TA at the side of the camera. In case the automatic exposure photography under the day light is carried out by means of the self timer in the above mentioned state, the power source switch 90 is connected to the contact 90a, in operative engagement with which the switch 91 is connected to the contact 91a and the mark SELF on the dial 59 is set at the index 60. Then, the photography can be carried out in the above mentioned automatic exposure mode.

In case the flash light photography is carried out by means of the self timer, the power source switch 90 is connected to the contact 90b, in operative engagement with which the switch 91 is connected to the contact 91a and the mark SELF A on the mode change over dial 59 at the index 60. Then, the flash light photography can be carried out by means of the self timer in accordance with the charge completion of the speed light device, while when the flash light photography is not carried out the automatic exposure photography can be carried out under the day light.

Namely, when on the accessory shoe 56 of the camera the exclusive speed light device is mounted and the power source switch 90 is connected to the contact 90a, in operative engagement with which the switch 91 is connected to the contact 91a, the voltage of the power source 75 is raised by means of the step up circuit 76 so as to charge the main condenser. When then the mode change over dial 59 is rotated so as to set the mark SELF A on the dial 59 at the index 60 the brush 64a is brought in contact with the conductor pattern 63b, so that the self timer switch SW7 is closed, while the self timer switch SW12 and the flash light switch SW60 are set in the opened state. When then the aperture setting ring 1 is rotated so as to set the determined aperture value (the aperture value appointed by the then exclusive speed light device, for example 5.6 for the light adjusting speed light device) at the index 2, the aperture preset ring 3 is rotated by means of the spring 3a, following the rotation of the aperture setting ring 1. The rotation of the aperture preset ring 3 is transmitted to the lever 24 through the signal lever 29 so as to set the value corresponding to the set aperture value at the variable resistance 25.

When the release button 58 is pushed, along with the first stroke of the release button 58 the switch SW1 is closed so as to bring the transistor TR9 in the switch on state and the voltage Vcc is produced. Then, the initial clearance of the circuit is carried out by means of the power up clear circuit until the voltage Vcc reaches the lowest guarantee voltage. After the clearance of the circuit the output at the output terminal ST0 of the decoder DE1 becomes high in level and the light measurement calculation output is charged by means of the A-D conversion circuit for 9.1 ms. After the lapse of 9.1 ms the level at the output terminal ST1 of the decoder DE1 is made high in level and the charge level of the A-D conversion is discharged with a constant current. As the result, the output of the comparator CP5 is converted high in level, while the output at the output terminal ST0 of the decoder DE1 becomes again high in level. After the above mentioned A-D conversion operation has been repeated at least four times, along with the second stroke of the release button 58, the switch SW2 is closed and the output of the Flip-Flop F8 becomes high in level. The operation after the closing of the switch SW1 is carried out in the same way as in case of the automatic exposure photography. Because at this time the self timer switch SW7 is closed, the output at the output terminal ST2 of the decoder DE1 becomes high in level in the same way as in case of the automatic exposure photography by means of the self timer. When at this time, the voltage Vcc is lower than the lowest guarantee voltage for controlling the camera the release operation is prohibited and the output at the output terminal ST0 of the decoder DE1 becomes high in level, while when the voltage Vcc is higher than the lowest guarantee voltage for controlling the camera the output at the output terminal ST3 of the decoder DE1 becomes high in level after the lapse of 10 sec. after the output at the output terminal ST2 of the decoder DE1 has become high in level. During this period the LED2 flickers. As mentioned above the output at the output terminal ST2 of the decoder DE1 remains high in level and is delivered to the NAND gate N35. Because to the NAND gate N35 the pulses with 4 Hz of the counter C2 are delivered and to the NAND gate N34 through the NAND gate N35 and the inverter I13, whereby the NAND gate N34 produces an output. When in this way the main condenser 77 at the side of the speed light device has been charged sufficiently to carry out the flash light photography, while the self timer operation and the A-D conversion operation are carried out, the detecting circuit 78 detects the fact and lights the neon tube 79a in the display circuit 79, which displays that the charge has been completed. When the neon tube 79 has lit, a current is supplied to the base of the transistor 88 so as to bring the transistor 88 in the switched on state. Thus, the level at the terminal TC', namely the terminal TC becomes low in level. Because the comparator CP3 is in the non-operative state when the level at the terminal TC becomes low in level in case the output of the NAND gate N35 is low in level, the output of the comparator CP3 becomes low in level when the output of the NAND gate N35 is converted high in level. After then, the output of the NAND gate N34 is kept high in level, while the output of the comparator CP3 is kept low in level. Because the transistor TR5 is in the switched off state even if the condenser 77 has been sufficiently charged in case the output of the NAND gate N35 is high in level, the output voltage KVC of the operational amplifier OP3 is delivered to the base of the transistor 82 through the terminals TC, TC', the switch 91 and the resistances 89, 93 so as to bring the transistor 82 in the switched on state. Thus, the low voltage side of the neon tube 79a is short circuited and no voltage is produced at the low voltage side, whereby the transistor 88 is kept in the switched off state. Thus, the output of the comparator CP3 is kept high in the level. When then the output of the NAND gate N35 becomes low in level the comparator CP3 is brought in the non-operative state, whereby the transistor TR5 is brought in the switched on state so that the level at the terminal TC becomes low in level, whereby the transistor 82 is brought in the switched off state, while the transistor 88 is brought in the switched on state. When the output of the NAND gate N35 becomes high in level, the output of the comparator CP3 becomes low in level. After then the level of the NAND gate N34 is kept high in level, while the output of the comparator CP3 is kept low in level. When the output of the comparator CP3 becomes low in level, the operational amplifier OP1AE is brought in the non-operative state, while the operational amplifier OP1EF is brought in the operative state in such a manner that the meter 57 displays the shutter time of 1/60 sec. When then the output at the output terminal ST3 of the decoder DE1 becomes high in level, the current is supplied to the shutter control magnet Mg3 in the same way as in case of the above mentioned automatic exposure photography. Further, whether the voltage Vcc is higher than the lowest operation guarantee voltage for the control of the camera or not, or whether the current is supplied to the shutter control magnet Mg3 or not is judged after the lapse of 5 ms, whereby in case there exists an irregularity the output at the output terminal ST0 of the decoder DE1 is made high in level and the production of the start signal is prohibited, while when there exists no irregularity the output at the terminal ST7 of the decoder DE1 is made high in level. Thus, the current is supplied to the release magnet Mg2 for 5 ms so as to actuate the internal mechanism of the camera. After the lapse of this 5 ms the output at the output terminal ST5 of the decoder DE1 becomes high in level. Along with the actuation of the internal mechanism of the camera the leading shutter curtain is opened and the count switch SW4 is opened. When then the synchronization contact SWX is closed in case the leading shutter curtain has run the base current of the transistor 81a runs to the display circuit 79 through the resistance 82, whereby the transistor 81c is brought in the switched on state. At this time, the condenser 81e has been charged through the resistance 81d in advance, so that when the transistor 81c is brought in the switched on state the charge stored in the condenser 81e is delivered to the trigger circuit 80 through the transistor 81 in such a manner that the trigger circuit 80 produces a trigger pulse. Then the light sensing element 86 senses the light reflected from the object, whereby when the output of the integrating circuit 87 has reached a certain determined value the discharge tube 84 is brought in the switched off state so as to stop the flash light emission. On the other hand, the high level signal from the output terminal ST4 of the decoder DE1 is delivered to the NAND gates N14 and N44 so that the NAND gate N49 is in a position to accept the output of the NAND gate N36. Because the output of the comparator CP3 is low in level, the outputs of the AND gates A7–A11 are all low in level, while the outputs of the NAND gates N53 and N54 are high in level. Thus, the inputs at the input terminals A, B and C of the decoder DE2 are 0, 0, 1, 0 and the level at the output terminal Q4 of the decoder DE2 becomes high in level. Thus, the output with 512 Hz of the counter C1 is delivered to the counter C4 through the NAND gates N41, N36, N49 and N51, whereby the counter C4 counts the pulses. Because at this time, a high level signal is delivered to the exclusive OR gate E1, while a low level signal is delivered to the exclusive OR gates E2 and E3, so that at the time point at which the counter C4 has counted 9 pulses, the counter C4 delivers a high level output from the output terminal Q4. Thus, the output of the NOR gate NR7 becomes high in level and delivered to the NOR gate NR8, whereby the output of the NOR gate NR9 which constitutes a Flip-Flop circuit together with the NOR gate NR8 is made high in level. Consequently, at the time point at which the output at the output terminal ST4 of the decoder DE1 has become high in level, namely after the lapse of 9/512 sec. during which 9 pulses with 512 Hz have been converted after the count switch SW4 has been counted, a high level output is delivered from the NOR gate NR9. After then, in the same way as in case of the automatic exposure photography the current supply to the shutter control magnet Mg3 is interrupted in such a manner that the tail shutter curtain starts to run and the mirror driving and the diaphragm driving mechanisms are returned to the initial positions, while the output at the output terminal ST6 of the decoder DE1 becomes high in level and after the lapse of 30 ms the output of the output terminal ST0 of the decoder DE1 becomes high in level.

When the switch SW2 is closed and the output at the output terminal ST3 of the decoder DE1 becomes high in level in the state the speed light device has not yet been charged while the A-D conversion operation is being repeated, the output of the NAND gate N34 becomes high in level. Because hereby the transistor TR5 is in the switched off state, the output voltage KVC from the operational amplifier OP3 is delivered to the base of the transistor 82 through the resistance R29, the terminals TC, TC', the switch 91 and the resistances 89 and 93, so that the transistor 82 is brought in the switched on state, while the low voltage side of the neon tube 79a is short circuited so that no voltage is produced at the low voltage side of the neon tube 79a so as to keep the transistor 88 in the switched off state. Thus, the output of the comparator CP3 is kept high in level. Then, the level at the output terminal ST3 of the decoder DE1 becomes high in level and the current is supplied to the shutter control magnet Mg3. Further, whether the voltage Vcc is higher than the lowest operation guarantee voltage for controlling the camera or not, or whether the current is supplied to the shutter control magnet Mg3 or not is judged after the lapse of 5 ms, whereby in case there exists an irregularity the output at the output terminal ST0 of the decoder DE1 is made high in level, so as to prohibit the production of the start signal, while in case there exists no irregularity the output at the output terminal ST7 of the decoder DE1 is made high in level. Thus, the current is supplied to the release magnet Mg2 for 5 ms so as to actuate the internal mechanism of the camera. When after the lapse of this 5 ms the output at the output terminal ST5 of the decoder DE1 becomes high in level. Along with the actuation of the internal mechanism of the camera the leading shutter curtain is opened and the switch SW4 is opened. Thus, the output at the output terminal ST4 of the decoder DE1 becomes high in level. When the leading shutter curtain has run the synchronization switch SWx is closed, whereby because the transistor 82 is in the switched on state the transistor 81a is not brought in the switched on state and the discharge tube 84 does not emit the flash light. When the output at th output terminal ST4 of the decoder DE1 becomes high in level, the A–D conversion value is stored longer in such a manner that the current supply to the magnet Mg3 is interrupted after this prolonged time. Thus, the tail shutter curtain starts to run and the mirror driving and the diaphragm driving mechanisms are returned to the initial position, whereby along with the release of the current supply to the magnet Mg3 the output at the output terminal ST6 of the decoder DE1 becomes high in level. Then, after the lapse of 30 ms the output at the output terminal ST0 of the decoder DE1 beecomes high in level. When the output at the output terminal ST0 of the decoder DE1 becomes high in level, after the lapse of 9.1 ms, the level at the output terminal ST1 of the decoder DE1 becomes high in level as long as the release button 58 is pushed, whereby the level at the output terminal ST0 of the decoder DE1 becomes high in level as mentioned above. The above mentioned operation is repeated, so that in case the charge has been completed when the level at the output terminal ST0 of the decoder DE1 has become high in level after the level at the output terminal ST0 of the decoder DE1 has become high in level, the output of the comparator CP3 becomes low in level, while the transistor 88 is brought in the switched off state. Consequently, even if the current supply to the magnet Mg3 is released before the shutter has run, the level at the output terminal ST0 of the decoder DE1 becomes high in level after the lapse of 30 ms after the current supply to the magnet Mg3 has been released in case the shutter time is set short, so that there is no fear that the transistor 88 should be brought in the switched off state before the shutter has run, so as to actuate the speed light device.

Below the winding up operation after the picture has been taken will be explained.

Along with the winding up by means of the winding up lever not shown in the drawing, the winding up shaft 14 and the charge cam 13 are rotated along the direction of the arrow, so as to carry out the film winding up and the shutter charge in operative engagement with a winding up mechanism not shown in the drawing, whereby the count switch SW4 and the winding up completion switch are closed. At the same time the operation of the charge cam 13 is transmitted to the transmission lever 18 through the roller 15, the intermediary lever 16 and the connecting lever 17. By means of this transmission lever 18 the pin 23b of the start lever 23 is pushed through the charge plate 18a. The holding lever 22 provided coaxially, making one body with the start lever 23 is rotated against the strength of the spring 22 along the clockwise direction, whereby the armature 21 is attracted by means of the magnet 20, which hold the armature 21 by means of the attractive force of the permanent magnet 20. The charge plate 18a of the transmission lever 18 consists of an elastic material so as to absorb the irregularity of the transmission lever 18. Consequently, the armature 21 is always attracted by means of the magnet Mg2 with a constant strength. Further, the connecting lever 17 rotates the charge lever 12 along the clockwise direction so as to rotate the automatic diaphragm driving energy storing lever 5 against the strength of the spring 5a along the counterclockwise direction by means of its pin 12a, until the level 5 is held by means of the holding claw. Along with the rotation of the automatic diaphragm driving energy storing lever 5, the mirror driving lever 31 is rotated along the clockwise direction, whereby the mirror rising holding claw 33 is rotated till it is held by means of the mirror raising lever 32. The leading curtain release lever 37 is rotated against the strength of the spring 37a by means of the set lever 40 in operative engagement with the winding up mechanism not shown in the drawing until it is held by means of the leading curtain holding lever 36. The leading shutter curtain gear 39 and the tail shutter curtain gear 42 is rotated along with the shutter charge, whereby the leading shutter curtain 39 is held by means of the leading shutter curtain tension gear lever 38. Hereby, the tail shutter curtain 42 is held by means of the attractive lever 44, which is held in operation engagement with the winding up mechanism not shown in the drawing at a position at which the armature 45 is in contact with the magnet Mg3. The armature 45 is released when the current is supplied to the magnet Mg3. The manual winding up operation is carried out in this way. After this, the above mentioned various modes of photographing operation becom possible. Hereby, by repeating the above operation the photography picture by picture can be continued in a corresponding mode.

Beside the above mentioned photography picture by picture, the continuous photography in a corresponding mode is also possible by means of the motor winding up device. The photographing operation and the winding up operation in each of the mode in this case are carried out in the same way as in the above mentioned case, whereby a curtain determined delay time is provided between the termination of the winding up operation and the start of the photographing operation.

Namely, in case of the continuous photographing the winding up operation is completed while the release button 58 is being pushed, whereby the switches SW1 and SW2 remain in the closed state. Consequently, when the winding up operation has not yet been completed even if the switches SW1 and SW2 are closed, the switch SW5 remains opened, whereby a high level signal in accordance with the opening of the switch SW5 is inverted by means of the inverter I23 and delivered to the NAND gates N23, N25 and the NOR gate NR3. Because at this time the A–D conversion after the termination of the photographing operation has been carried out, the output of the NAND gate N33 is low in level, while the output of the NOR gate NR3 is high in level so as to reset the counter C2. The output of the NAND gate N26 is low in level when the output at the output terminal ST0 of the decoder DE1 is high in level, and high in level when the output at the output terminal ST1 of the decoder DE1 is high in level. Consequently, the output of the NAND gate N24 is high in level when the output of the NAND gate N26 is low in level, and low in level when the output of the NAND gate N26 is high in level. Even if the NAND GATE N24 is high in level, the count switch SW4 and so on is closed, so that the AND gates A2 does not operate so as to prohibit the release operation. Along with the completion of the winding up operation the switch SW5 is closed and a low level signal in accordance with the closing of this switch is inverted by means of the inverter I23 and delivered to the NAND gates N23, N25 and the NOR gate NR3. Thus, the output of the NOR gate NR3 becomes low in level so as to release the counter C2 which has been reset. Thus, the counter C2 starts to count the counting, and when the outputs with 4 Hz and 8 Hz of the counter C2 become high in level the high level signal from the AND gate A1 is delivered to the NAND gate N23, whose output is made low in level, while the output of the NAND gate N24 is made high in level and the output of the AND gate A2 is made high in level so as to carry out the release operation of the camera. Namely, after the lapse of the termination of the winding up operation, the release operation becomes possible, which is intended to prohibit the release operation until the fill completely stands still after the termination of the film winding up operation.

In case of the battery is checked, the button 71 is pushed so as to change over the switch SW8 to the contact NO in such a manner that the current is supplied to the negative resistance R46 and the voltage level is visually acknowledged in the meter 57.

As explained so far in detail in accordance with the present invention in case of the automatic exposure control camera with priority on aperture value only having the automatic exposure photographing mode the charge completion signal terminal and the manual shutter time setting switch are connected to the input terminal of the mode change over means, whereby when the manual shutter time setting switch is operated a certain level of signal is delivered to the input terminal of the mode change over means in such a manner that the change over means is changed over to the flash light photographing mode in the same way as in case the charge completion signal is delivered so that without providing a special circuit for setting the shutter time of 1/60 sec. a universal speed light device can be used, which is remarkably profitable in practice.

Further, in accordance with the present invention, the change over means is brought in the operative state and in the non-operative state in a repeated way in accordance with the output of the oscillator operating during the light measuring operation in such a manner that the change over means is in a position to accept the charge completion signal immediately before the start of the release operation. However, in case of this kind of camera, if the power source switch is closed even after the tail shutter curtain has been released, the light measuring operation state is assumed in accordance with the tail shutter curtain release signal so that it is possible for the speed light device to emit the flash light in accordance of the output of the oscillator. Namely, there exists a danger for misoperation of the speed light device in case of the short shutter time. Thus, in accordance with the present invention, a delay means which starts to operate after the release of the tail shutter curtain in such a manner that in order to avoid the misoperation of the speed light device the light measuring operation state is assumed after the lapse of a certain determined delay time after the delivery of the tail shutter curtain release signal.

What is claimed is:

1. An automatic exposure control device for a single lens reflex camera having a curtain type shutter and adapted to operate with a flash device capable of producing a charge completion signal, comprising:
    switchover means for automatically shifting from an automatic exposure photographic mode to a flash mode and vice versa, said switchover means having an input terminal and being arranged to effect a switchover to the flash mode when a charge completion signal from the flash device is applied to said input terminal;
    signal producing means for producing a signal of predetermined level corresponding to the charge completion signal;
    a terminal capable of receiving the charge completion signal from the flash device;
    a connection line arranged to electrically connect the input terminal of the switchover means and said terminal to each other; and
    switch means having one end connected directly to the connection line and another end being arranged to perform a switching action to apply the signal of the predetermined level of said signal producing means to the input terminal of said switchover means, said switchover means being arranged to effect a switchover to the flash mode in response to the switching action in the same manner as when the charge completion signal is applied thereto; and
    mode setting means without a manual photographic mode, said means having a setting position for an automatic exposure photographic mode and a setting position for a flash photographic mode, and causing the switch means to act so as to generate a predetermined level of signal from the signal producing means when it is at the flash photographic mode position, and causing the switch means to act so as to prevent the generation of the predetermined level of signal from the signal producing means when it is at the automatic exposure photographic mode position.

2. A camera in accordance with claim 1, wherein the signal producing means is a power source having a positive and negative potential and the negative potential of the power source establishes the signal with the predetermined level.

3. A camera in accordance with claim 1, further comprising an operation member settable to a flash mode for operating the switch means so that when the operation member is set at the flash mode the switch means performs the switching operation.

4. A camera in accordance with claim 1, further comprising an accepting means for accepting the signal with the predetermined level at the input terminal of the switchover means and for accepting the signal until the time immediately before the start of the release operation and after the lapse of a given time after the operation of the shutter.

* * * * *